US009988535B2

(12) United States Patent
Mizuno et al.

(10) Patent No.: US 9,988,535 B2
(45) Date of Patent: Jun. 5, 2018

(54) THIOL GROUP-CONTAINING COLORED COMPOUND, METAL NANOWIRE, DISPERSION LIQUID, TRANSPARENT CONDUCTIVE FILM, INFORMATION INPUT DEVICE, AND ELECTRONIC APPARATUS

(71) Applicant: Dexerials Corporation, Shinagawa-ku, Tokyo (JP)

(72) Inventors: Mikihisa Mizuno, Sendai (JP); Yasuhisa Ishii, Utsunomiya (JP); Ryosuke Iwata, Utsonomiya (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 0 days. days.

(21) Appl. No.: 14/914,334

(22) PCT Filed: Aug. 14, 2014

(86) PCT No.: PCT/JP2014/004192
§ 371 (c)(1),
(2) Date: Feb. 25, 2016

(87) PCT Pub. No.: WO2015/029360
PCT Pub. Date: Mar. 5, 2015

(65) Prior Publication Data
US 2016/0208104 A1 Jul. 21, 2016

(30) Foreign Application Priority Data

Aug. 26, 2013 (JP) .................. 2013-174960

(51) Int. Cl.
C09B 49/12 (2006.01)
C09B 49/00 (2006.01)
(Continued)

(52) U.S. Cl.
CPC ............ *C09B 49/128* (2013.01); *C09B 49/00* (2013.01); *C09B 49/02* (2013.01); *C09B 49/06* (2013.01);
(Continued)

(58) Field of Classification Search
CPC ........... H01B 1/22; C09B 49/00; C09B 49/02; C09B 49/06; C09B 49/122; C09B 49/126;
(Continued)

(56) References Cited

U.S. PATENT DOCUMENTS 7,967,872 B2   6/2011   L'Oreal
8,038,732 B2   10/2011  L'Oreal
(Continued)

FOREIGN PATENT DOCUMENTS

CN   1482686 A    3/2004
CN   1709171 A    12/2005
(Continued)

OTHER PUBLICATIONS

Oct. 8, 2016, Office Action issued by the State Intellectual Property Office in the corresponding Chinese Patent Application No. 201480047003.9.
(Continued)

*Primary Examiner* — Camie S Thompson
(74) *Attorney, Agent, or Firm* — Kenja IP Law PC

(57) ABSTRACT

The thiol group-containing colored compound includes a chromophore having absorption in a visible light region, a thiol group, and a spacer provided between the chromophore and the thiol group. The spacer is a chain alkylene group having 2 to 30 carbon atoms, a cyclic alkylene group having 3 to 30 carbon atoms, or a derivative of either alkylene group in which the number of carbon atoms in an additional structure of the alkylene group is equal to or less than the number of carbon atoms in the alkylene group.

10 Claims, 6 Drawing Sheets

(51) Int. Cl.
C09B 49/02 (2006.01)
C09B 49/06 (2006.01)
H01B 1/22 (2006.01)
B82Y 30/00 (2011.01)

(52) U.S. Cl.
CPC .......... C09B 49/122 (2013.01); C09B 49/126 (2013.01); H01B 1/22 (2013.01); B82Y 30/00 (2013.01)

(58) Field of Classification Search
CPC ............... C09B 49/128; Y10T 428/256; Y10T 428/31678; H01L 51/5234; H01L 2251/5369; H01L 33/42
USPC .................. 428/328, 457, 108, 117; 427/108
See application file for complete search history.

(56) References Cited

U.S. PATENT DOCUMENTS

| 8,398,722 | B2 | 3/2013 | L'Oreal |
| 2010/0263139 | A1 | 10/2010 | L'Oreal |
| 2010/0287714 | A1 | 11/2010 | L'Oreal |
| 2012/0266392 | A1* | 10/2012 | Greaves ............... A61K 8/4933 8/405 |

FOREIGN PATENT DOCUMENTS

| EP | 2193172 | A2 | | 6/2010 |
| EP | 2547735 | A1 | | 1/2013 |
| JP | H05-295283 | A | | 11/1993 |
| JP | H11-305375 | A | | 11/1999 |
| JP | 2009-534474 | A | | 9/2009 |
| JP | 2009-536671 | A | | 10/2009 |
| JP | 2010-507199 | A | | 3/2010 |
| JP | 2010-525526 | A | | 7/2010 |
| JP | 2010-525527 | A | | 7/2010 |
| JP | 2010-539250 | A | | 12/2010 |
| JP | 2010-539315 | A | | 12/2010 |
| JP | 4893867 | | * | 3/2012 |
| JP | 2012-190777 | A | | 10/2012 |
| JP | 2012-190780 | A | | 10/2012 |
| JP | 2013-214507 | A | | 10/2013 |
| KR | 10-20110129612 | | * | 12/2011 |
| WO | 2007/110534 | A2 | | 10/2007 |
| WO | 2009034059 | A2 | | 3/2009 |
| WO | 2009037324 | A2 | | 3/2009 |
| WO | 2013133272 | A1 | | 9/2013 |
| WO | 2015115577 | A1 | | 8/2015 |

OTHER PUBLICATIONS

Piers Andrew et al., "Functionalised Silver Nanowire Structures", Journal of Physics: Conference Series, vol. 6, pp. 36-40.

May 17, 2016, Notification of Reasons for Refusal issued by the Japan Patent Office in the corresponding Japanese Patent Application No. 2015-196023.
Jan. 26, 2016, Office Action issued by the Japan Patent Office in the corresponding Japanese Patent Application No. 2015-196023.
Nombona, N. et al., Photophysical and photochemical studies of sulfurcontaining phthalocyanine derivatives in the presence of folic acid, Inorganica Chimica Acta, 2012, vol. 392, pp. 380-387.
Nombona, N. et al., Synthesis of phthalocyanine conjugates with gold nanoparticles and liposomes for photodynamic therapy, Journal of Photochemistry and Photobiology, B: Biology, 2012, vol. 107, pp. 35-44.
Nombona, N. et al., Synthesis and photophysical studies of phthalocyanine-gold nanoparticle conjugates, Dalton Transactions, 2011, vol. 40, No. 44, pp. 11876-11884.
Moeno, S. et al., Synthesis and photophysical properties of a novel zinc photosensitizer and its gold nanoparticle conjugate, Journal of Photochemistry and Photobiology, A: Chemistry, 2011, vol. 22, No. 2-3, pp. 343-350.
Hone, D. C. et al., Generation of Cytotoxic Singlet Oxygen via Phthalocyanine-Stabilized Gold Nanoparticles: A Potential Delivery Vehicle forPhotodynamic Therapy, Langmuir, 2002, vol. 18, No. 8, pp. 2985-2987.
Masilela, N. et al., Axial coordination of zinc and silicon phthalocyanines to silver and gold nanoparticles: an investigation of their photophysicochemical and antimicrobial behavior, Journal of Porphyrins and Phthalocyanines, vol. 17, No. 6-7, pp. 417-430.
Nov. 4, 2014, International Search Report issued in International Patent Application No. PCT/JP2014/004192.
Langmuir, 1997, vol. 13, No. 3, p. 460-4.
Physical Chemistry Chemical Physics, 2006, 8(28), p. 3314-9.
Dagmar Hülsenberg et al: "Chromophore", Thieme Römpp Chemie Lexikon, Jan. 1, 2009, XP055369773, Retrieved from the Internet <URL: https://roempp.thieme.de/roempp4.0/do/data/RD-03-01732> [retrieved on May 5, 2017].
Jul. 11, 2017, Notification of Reasons for Refusal issued by the Japan Patent Office in the corresponding Japanese Patent Application No. 2013-174960.
Jun. 21, 2017, Office Action issued by the State Intellectual Property Office in the corresponding Chinese Patent Application No. 201480047003.9.
May 19, 2017, Extended European Search Report issued by the European Patent Office in the corresponding European Patent Application No. 14840762.0.
Dec. 19, 2017, Communication pursuant to Article 94(3) EPC issued by the European Patent Office in the corresponding European Patent Application No. 14840762.0.
Feb. 8, 2018, Office Action issued by the State Intellectual Property Office in the corresponding Chinese Patent Application No. 201480047003.9.
Mar. 9, 2018, Office Action issued by the Taiwan Intellectual Property Office in the corresponding Taiwanese Patent Application No. 104139808.

* cited by examiner

THIOL GROUP-CONTAINING COLORED COMPOUND, METAL NANOWIRE, DISPERSION LIQUID, TRANSPARENT CONDUCTIVE FILM, INFORMATION INPUT DEVICE, AND ELECTRONIC APPARATUS

CROSS-REFERENCE TO RELATED APPLICATION

This application claims priority to and the benefit of Japanese Patent Application No. 2013-174960 filed on Aug. 26, 2013, the entire contents of which are incorporated herein by reference.

TECHNICAL FIELD

This disclosure relates to a thiol group-containing colored compound, metal nanowires, a dispersion liquid, a transparent conductive film, an information input device, and an electronic apparatus, and in particular to a thiol group-containing colored compound, metal nanowires surface treated with the thiol group-containing colored compound, a dispersion liquid that includes the metal nanowires, a transparent conductive film that includes the metal nanowires, an information input device that includes the transparent conductive film, and an electronic apparatus that includes the transparent conductive film.

BACKGROUND

A metal oxide, such as Indium Tin Oxide (ITO), has been used in transparent conductive films that need to have a high light transmittance, such as the transparent conductive film provided on the display surface of a touch panel or other display panel and the transparent conductive film in an information input device provided on the display surface of a display panel. However, the manufacturing cost of a transparent conductive film using a metal oxide is high, since the film is formed by sputtering in a vacuum environment. Furthermore, such a film tends to crack or peel due to deformation such as bending or warping.

Therefore, as an alternative to a transparent conductive film using a metal oxide, a transparent conductive film using metal nanowires is being studied. This film may be formed by coating or printing and is also highly resistant to bending and warping. Such a transparent conductive film using metal nanowires is also attracting attention as a next-generation transparent conductive film that eliminates the use of indium, which is a rare metal (for example, see JP 2010-507199 A (PTL 1) and JP 2010-525526 A (PTL 2)).

The transparent conductive film described in PTL 1, however, might exhibit redness and suffer a loss of transparency.

Furthermore, when the transparent conductive film using metal nanowires is provided on the display surface of a display panel, external light is diffusely reflected by the surfaces of the metal nanowires, causing a "black float phenomenon" where the display of black by the panel is slightly bright. The black float phenomenon lowers the contrast of images, thereby deteriorating display characteristics.

As one approach to prevent the occurrence of black floating, gold nanotubes using Gold (Au), which does not tend to reflect light diffusely, have been proposed. Formation of gold nanotubes starts with application of a gold plating to a template of silver nanowires, which tend to reflect light diffusely. Subsequently, the silver nanowire portions used as the template are etched or oxidized for conversion to gold nanotubes (for example, see JP 2010-525527 A (PTL 3)).

As another approach for preventing the diffuse reflection of light, use of a combination of metal nanowires and secondary conductive media (such as Carbon Nanotubes (CNTs), conductive polymers, and ITO) has been proposed (for example, see PTL 2).

However, with the gold nanotubes obtained with the former approach, the silver nanowires used as a template are a waste of material, and moreover, metal material for the gold plating is required. This increases the cost of the materials and complicates the manufacturing process, resulting in an increased manufacturing cost.

The latter approach runs the risk of a loss of transparency due to the secondary conductive media (coloring materials) such as the CNTs, conductive polymers, and ITO being located in gaps in the metal nanowire network.

To solve the above problems, a transparent conductive film including metal nanowires and a colored compound (dye) adsorbed on the metal nanowires has been proposed (for example, see JP 2012-190777 A (PTL 4) and JP 2012-190780 A (PTL 5)). In the proposed transparent conductive film including the metal nanowires and the colored compound (dye) adsorbed on the metal nanowires, the colored compound adsorbed on the metal nanowires absorbs visible light and prevents diffuse reflection of light at the surfaces of the metal nanowires. In the transparent conductive film, the colored compound (dye) adsorbed on the metal nanowires is represented by, for example, the formula R—X, where R is a chromophore and X is an adsorptive functional group. Accordingly, the loss of transparency due to the addition of the colored compound (dye) is controlled.

In the colored compound (dye) adsorbed on the metal nanowires, however, when the adsorptive functional group X is a sulfo group, a sulfonate group, an amino group, a carboxyl group, a carboxyalte group, or the like, the metal nanowires might dissolve. Therefore, a transparent conductive film (transparent electrode) containing metal nanowires that are surface-modified with a colored compound (dye) is problematic in that the metal nanowires may break and become shorter, and the conductivity may degrade.

CITATION LIST

Patent Literature

PTL 1: JP 2010-507199 A
PTL 2: JP 2010-525526 A
PTL 3: JP 2010-525527 A
PTL 4: JP 2012-190777 A
PTL 5: JP 2012-190780 A

SUMMARY

Technical Problem

It would therefore be helpful to provide a thiol group-containing colored compound that allows manufacture of a transparent conductive film that can prevent scattering of external light and has a small sheet resistance by adsorbing the colored compound on a nanowire body without dissolving the metal nanowire body (surface treating the metal nanowire body with the colored compound), thereby allowing manufacture of an information input device and an electronic apparatus that can improve anti-black floating properties (bright room contrast) and electrode pattern invisibility, and to provide metal nanowires that are surface treated with the thiol group-containing colored compound, a dispersion liquid that includes the metal nanowires, a transparent conductive film that includes the metal nanowires, an information input device that includes the transparent conductive film, and an electronic apparatus that includes the transparent conductive film.

Solution to Problem

We therefore performed intense studies and discovered that by selecting a thiol group as an adsorptive functional group that adsorbs on the surface of metal nanowire and surface treating a metal nanowire body using a thiol group-containing colored compound with a spacer provided between the thiol group and the chromophore, the colored compound can be adsorbed on the metal nanowire body (metal nanowire can be surface treated with the colored compound) without dissolving the metal nanowire body, thereby completing the subject matter of this disclosure.

Based on the above discovery, embodiments of this disclosure for solving the above problem are as follows.

<1> A thiol group-containing colored compound including: a chromophore having absorption in a visible light region, a thiol group, and a spacer provided between the chromophore and the thiol group, such that the spacer is a chain alkylene group having 2 to 30 carbon atoms, a cyclic alkylene group having 3 to 30 carbon atoms, or a derivative of either alkylene group in which the number of carbon atoms in an additional structure of the alkylene group is equal to or less than the number of carbon atoms in the alkylene group.

In the thiol group-containing colored compound according to aspect <1>, a thiol group is selected as the adsorptive functional group, and a spacer is provided between the thiol group and the chromophore. Hence, the acidity can be reduced, thereby allowing the colored compound to be adsorbed on the metal nanowire body without dissolving the metal nanowire body (allowing the metal nanowire body to be surface treated with the colored compound). This allows manufacture of a transparent conductive film that can prevent scattering of external light and has a small sheet resistance, thereby allowing manufacture of an information input device and an electronic apparatus that can improve anti-black floating properties (bright room contrast) and electrode pattern invisibility.

<2> The thiol group-containing colored compound of aspect <1>, such that the compound is represented by general formula (I):

$$R-W-SH \quad (1)$$

where R is a chromophore having absorption in a visible light region, and W is a chain alkylene group having 2 to 30 carbon atoms, a cyclic alkylene group having 3 to 30 carbon atoms, or a derivative of either alkylene group in which the number of carbon atoms in an additional structure of the alkylene group is equal to or less than the number of carbon atoms in the alkylene group.

In the thiol group-containing colored compound according to aspect <2>, when the thiol group-containing colored compound represented by general formula (1) above separates in an aqueous solution as in formula (2) below, the spacer W reduces the effect of the chromophore R on the anion (S⁻) derived from a thiol group and suppresses the generation of protons (H⁺). Therefore, acidity is reduced, allowing the colored compound to be adsorbed on the metal nanowire body without dissolving the metal nanowire body (allowing the metal nanowire body to be surface treated with the colored compound). This allows manufacture of a transparent conductive film that can prevent scattering of external light and has a small sheet resistance.

$$H^+ + RWS^- \quad (2)$$

<3> The thiol group-containing colored compound of aspect <1> or <2>, such that the chromophore includes at least one selected from the group consisting of an unsaturated alkyl group, an aromatic group, a heterocyclic ring, and a metal ion.

<4> The thiol group-containing colored compound of aspect <1> or <2>, such that the chromophore includes at least one selected from the group consisting of a nitroso group, a nitro group, an azo group, a methine group, an amino group, a ketone group, a thiazolyl group, a naphthoquinone group, an indoline group, a stilbene derivative, an indophenol derivative, a diphenylmethane derivative, an anthraquinone derivative, a triarylmethane derivative, a diazine derivative, an indigoid derivative, a xanthene derivative, an oxazine derivative, a phthalocyanine derivative, an acridine derivative, a thiazine derivate, a sulfur atom-containing compound, and a metal ion-containing compound.

<5> The thiol group-containing colored compound of aspect <4>, such that the chromophore includes at least one selected from the group consisting of a Cr complex, a Cu complex, a Co complex, a Ni complex, an Fe complex, an azo group, and an indoline group.

<6> A metal nanowire including a metal nanowire body, such that at least a portion of a surface of the metal nanowire body is surface treated with the thiol group-containing colored compound of any one of aspects <1> to <5>.

In the metal nanowire according to aspect <6>, the metal nanowire includes a metal nanowire body, and at least a portion of the surface of the metal nanowire body is surface treated with the thiol group-containing colored compound. Therefore, the metal nanowire can be prevented from breaking and becoming shorter, and an information input device and an electronic apparatus that can prevent scattering of external light and can improve anti-black floating properties (bright room contrast) and electrode pattern invisibility can be manufactured.

<7> The metal nanowire of aspect <6>, such that the metal nanowire body comprises at least one element selected from the group consisting of Ag, Au, Ni, Cu, Pd, Pt, Rh, Ir, Ru, Os, Fe, Co, Sn, Al, Tl, Zn, Nb, Ti, In, W, Mo, Cr, Fe, V, and Ta.

<8> A dispersion liquid including: the metal nanowires of aspect <6> or <7>; a solvent; and a binder.

The dispersion liquid according to aspect <8> includes the metal nanowires according to aspect <6> or <7>, a solvent, and a binder. Therefore, an information input device and an electronic apparatus that can prevent scattering of external light and can improve anti-black floating properties (bright room contrast) and electrode pattern invisibility can be manufactured.

<9> A transparent conductive film including the metal nanowires of aspect <6> or <7>.

The transparent conductive film according to aspect <9> includes the metal nanowires according to aspect <6> or <7>. Therefore, an information input device and an electronic apparatus that can prevent scattering of external light and can improve anti-black floating properties (bright room contrast) and electrode pattern invisibility can be manufactured.

<10> The transparent conductive film of aspect <9>, such that the metal nanowires are dispersed in a transparent binder.

<11> The transparent conductive film of aspect <9> or <10>, such that a reflection L value of the transparent conductive film is 9 or less.

<12> The transparent conductive film of any one of aspects <9> to <11>, further including a metal nanowire body that is not surface treated with the thiol group-containing colored compound.

<13> An information input device including: a transparent substrate; and the transparent conductive film of any one of aspects <9> to <12> disposed on the transparent substrate.

The information input device according to aspect <13> includes a transparent substrate and the transparent conductive film according to any one of aspects <9> to <12> disposed on the transparent substrate. Therefore, scattering of external light can be prevented, and anti-black floating properties (bright room contrast) and electrode pattern invisibility can be improved.

<14> An electronic apparatus including: a display panel; and the transparent conductive film of any one of aspects <9> to <12> disposed on the display panel.

The electronic apparatus according to aspect <14> includes a display panel and the transparent conductive film according to any one of aspects <9> to <12> disposed on the display panel. Therefore, scattering of external light can be prevented, and anti-black floating properties (bright room contrast) and electrode pattern invisibility can be improved.

Advantageous Effect

According to this disclosure, the above problems are solved by providing a thiol group-containing colored compound that allows manufacture of a transparent conductive film that can prevent scattering of external light and has a small sheet resistance by adsorbing the colored compound on a metal nanowire body without dissolving the metal nanowire body (surface treating the metal nanowire body with the colored compound), thereby allowing manufacture of an information input device and an electronic apparatus that can improve anti-black floating properties (bright room contrast) and electrode pattern invisibility, and providing metal nanowires that are surface treated with the thiol group-containing colored compound, a dispersion liquid that includes the metal nanowires, a transparent conductive film that includes the metal nanowires, an information input device that includes the transparent conductive film, and an electronic apparatus that includes the transparent conductive film.

DETAILED DESCRIPTION (Thiol Group-Containing Colored Compound)

Figure 1:
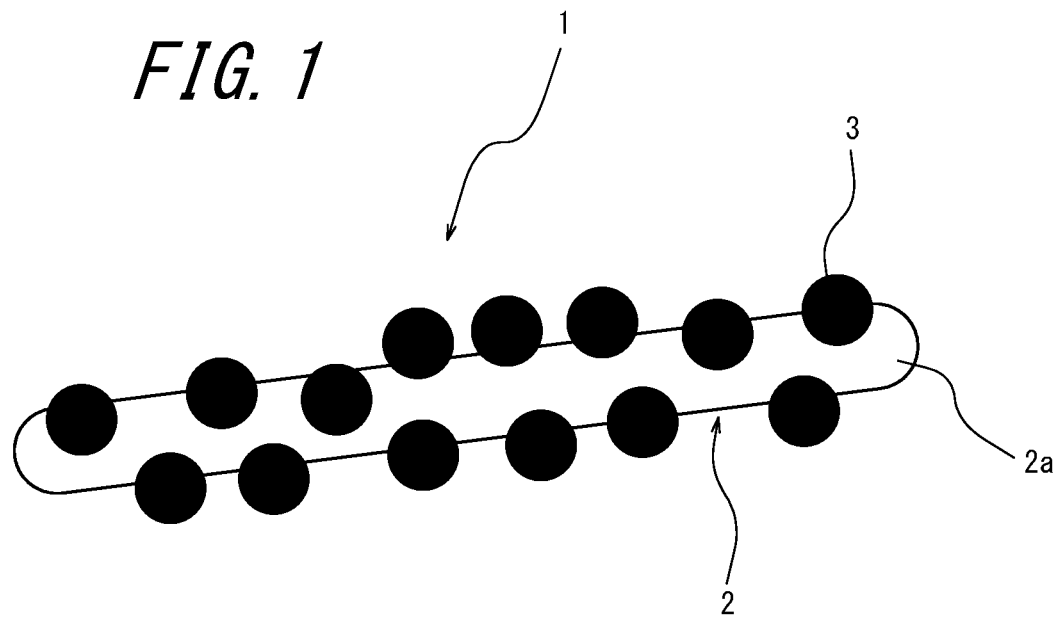
FIG. 1 is a schematic view illustrating the metal nanowire of this disclosure.

The thiol group-containing colored compound of this disclosure includes at least a chromophore, a thiol group (SH group, mercapto group, sulfhydryl group), and a spacer. Other portions are included as necessary. In other words, in the thiol group-containing colored compound, the number of chromophores and the number of thiol groups are not limited to one each and may be two or more. Furthermore, the thiol group-containing colored compound may include one or more types of adsorptive functional group other than a thiol group as the other portions.

The thiol group-containing colored compound has absorption in the visible light region and adsorbs on the below-described metal nanowire body. In this disclosure, the "visible light region" refers to the wavelength band from approximately 360 nm to 830 nm.

The thiol group-containing colored compound may be selected appropriately in accordance with the purpose without any limitation. Examples include compounds represented by general formula (1) below:

R—W—SH    (1)

where R is a chromophore having absorption in a visible light region, and W is a chain alkylene group having 2 to 30 carbon atoms, a cyclic alkylene group having 3 to 30 carbon atoms, or a derivative of either alkylene group in which the number of carbon atoms in an additional structure of the alkylene group is equal to or less than the number of carbon atoms in the alkylene group.

—Chromophore R—

The chromophore R may be selected appropriately in accordance with the purpose without any limitation as long as the chromophore has absorption in the visible light region. Examples include an unsaturated alkyl group, an aromatic, a heterocycle, and a metal ion. One of these may be used alone, or a combination of two or more may be used.

Among these, cyanine, quinone, ferrocene, triphenylmethane, and quinoline are preferable in that they allow a transparent conductive film with improved transparency to be manufactured.

Specific examples of the chromophore R include a nitroso group, a nitro group, an azo group, a methine group, an amino group, a ketone group, a thiazolyl group, a naphthoquinone group, an indoline group, a stilbene derivative, an indophenol derivative, a diphenylmethane derivative, an anthraquinone derivative, a triarylmethane derivative, a diazine derivative, an indigoid derivative, a xanthene derivative, an oxazine derivative, a phthalocyanine derivative, an acridine derivative, a thiazine derivate, a sulfur atom-containing compound, and a metal ion-containing compound. One of these may be used alone, or a combination of two or more may be used.

Among these, a Cr complex, a Cu complex, a Co complex, a Ni complex, an Fe complex, an azo group, and an indoline group are preferable in that they allow a transparent conductive film with improved transparency to be manufactured.

—Spacer W—

The spacer W is provided between the chromophore R and the thiol group and is a chain alkylene group having 2 to 30 carbon atoms, a cyclic alkylene group having 3 to 30 carbon atoms, or a derivative of either alkylene group in which the number of carbon atoms in an additional structure of the alkylene group is equal to or less than the number of carbon atoms in the alkylene group. As long as the acidity of the thiol group does not become too high, the main chain of the spacer W may include at least one selected from the group consisting of an unsaturated bond, an ether bond, a carbonyl bond, an ester bond, an amide bond, an urethane bond, a hydrogen bond, an aromatic, and a heterocycle.

The spacer W plays a role in destabilizing the conjugate base of the thiol group-containing colored compound and reducing the acidity of the thiol group.

The spacer W is preferably electron-donating. The reason is that electrons can be donated to the thiol group, thereby reducing the acidity of the thiol group.

—Chain Alkylene Group—

The chain alkylene group may be selected appropriately in accordance with the purpose without any limitation as long as the number of carbon atoms is 2 to 30. Examples include a straight-chain alkylene group such as an ethylene group, a normal propylene group, a normal butylene group, and a normal hexylene group; and a branched-chain alkylene group such as an isopropylene group, isobutylene group, and a 2-methyl propylene group.

While the number of carbon atoms in the chain alkylene group may be any number between 2 and 30 selected appropriately in accordance with the purpose without any limitation, a number between 2 and 16 is preferable.

—Cyclic Alkylene Group—

The cyclic alkylene group may be selected appropriately in accordance with the purpose without any limitation as long as the number of carbon atoms is 3 to 30. Examples include a group containing a structure that is monocyclic, bicyclic, tricyclic, tetracyclic, pentacyclic, or the like (an alicyclic aliphatic group having an alicyclic component represented by Structural Formulas (a) to (s) below).

While the number of carbon atoms in the cyclic alkylene group may be any number between 3 and 30 selected appropriately in accordance with the purpose without any limitation, a number between 3 and 16 is preferable.

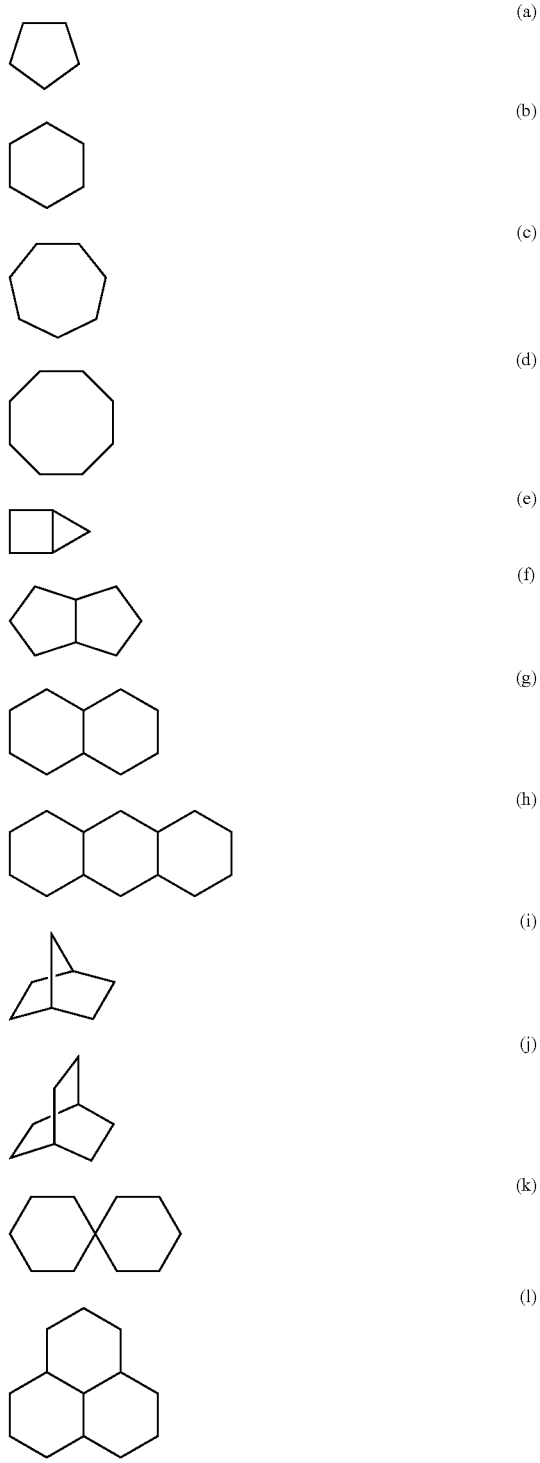

(m)
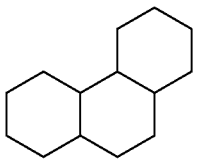

(n)

(o)
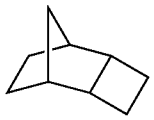

(p)

(q)

(r)
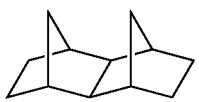

(s)
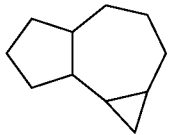

—Derivative of Alkylene Group—

The derivative of the alkylene group may be selected appropriately in accordance with the purpose without any limitation, as long as the number of carbon atoms in an additional structure of one of the above-described alkylene groups (the chain alkylene group with 2 to 30 carbon atoms or the cyclic alkylene group with 3 to 30 carbon atoms) is equal to or less than the number of carbon atoms in the alkylene group. Examples include a 2-amino ethylene group, 6-amino hexylene group, 11-amino undecylene group, 16-amino hexadecylene group, amino propylene group, amino butylene group, amino pentylene group, and amino octylene group.

A 4-pyridine ethylene group (the spacer W in dye E in the below-described Examples) is not included in the "Derivative of Alkylene Group" of this disclosure, since the number of carbon atoms (5) of the additional structure (4-pyridine) for the alkylene group (ethylene group) is not equal to or less than the number of carbon atoms (2) of the alkylene group (ethylene group).

—Other Portions—

The other portions may be selected appropriately in accordance with the purpose without any limitation. Examples include an adsorptive functional group other than a thiol group.

The adsorptive functional group other than a thiol group may be selected appropriately in accordance with the purpose without any limitation. Examples include a sulfo group (including a sulfonate salt), a sulfonyl group, a sulfonamide group, a carboxylic acid group (including a carboxylate salt), an amino group, an amide group, a phosphate group (including a phosphate and a phosphate ester), a phosphino group, a silanol group, an epoxy group, an isocyanate group, a cyano group, a vinyl group, a carbinol group, a hydroxyl group, and an atom that may coordinate to the metal constituting the metal nanowire body (such as nitrogen (N), sulfur (S), or oxygen (O)). One of these may be used alone, or a combination of two or more may be used.

Specific examples of the thiol group-containing colored compound may be selected appropriately in accordance with the purpose without any limitation and include (i) the product of reacting a dye containing an acid group with a molecule containing a basic group (a molecule containing a basic group, a thiol group, and a spacer), (ii) the product of reacting a dye containing a basic group with a molecule containing an acid group (a molecule containing an acid group, a thiol group, and a spacer), and (iii) the product of reacting a dye containing a reactive group with a molecule containing a hydroxyl group (a molecule containing a hydroxyl group, a thiol group, and a spacer). One of these may be used alone, or a combination of two or more may be used.

—(i) Product of Reacting Dye Containing Acid Group with Molecule Containing Basic Group (Molecule Containing Basic Group, Thiol Group, and Spacer)—

The reaction product is obtained as a result of reacting (i) the acid group, such as a sulfo group, a carboxyl group, a sulfonate group, or a carboxyalte group, in the dye containing the acid group with (ii) the basic group, such as an amino group, in the molecule containing the basic group.

The dye containing the acid group may be selected appropriately in accordance with the purpose without any limitation. Examples include a commercially available acid dye, a metal complex salt acid dye, and a direct dye. One of these may be used alone, or a combination of two or more may be used.

The molecule containing the basic group may be selected appropriately in accordance with the purpose without any limitation. Examples include 2-aminoethanethiol, 2-aminoethanethiol hydrochloride, 2-dimethylaminoethanethiol hydrochloride, 2-(diethylamino)ethanethiol hydrochloride, 2-diisopropylamino ethanethiol hydrochloride, 4-pyridine ethanethiol hydrochloride, 6-amino-1-hexanethiol hydrochloride, 8-amino-1-octanethiol hydrochloride, 11-amino-1-undecanethiol hydrochloride, 16-amino-1-hexadecanethiol hydrochloride, amino-EG6-undecanethiol hydrochloride, and amino-EG6-hexadecanethiol hydrochloride. One of these may be used alone, or a combination of two or more may be used.

—(ii) Product of Reacting Dye Containing Basic Group with Molecule Containing Acid Group (Molecule Containing Acid Group, Thiol Group, and Spacer)—

The reaction product is obtained as a result of reacting (i) the basic group, such as an amino group, in the dye containing the basic group with (ii) the acid group, such as a sulfo group, a carboxyl group, a sulfonate group, or a carboxyalte group, in the molecule containing an acid group.

The dye containing the basic group may be selected appropriately in accordance with the purpose without any limitation. Examples include a commercially available cationic dye.

The molecule containing the acid group may be selected appropriately in accordance with the purpose without any limitation. Examples include sodium 2-mercaptoethanesulfonate, sodium 3-mercapto-1-propanesulfonate, sodium 2,3- dimercaptopropane sulfonate, sodium 4-[(5-mercapto-1,3,4-thiadiazol-2-yl)thio]-1-butane sulfonate, sodium mercaptoacetate, sodium 2-(5-mercapto-1H-tetrazol-1-yl) acetate, 5-carboxy-1-pentanethiol, 7-carboxy-1-heptanethiol, 10-carboxy-1-decanethiol, 15-carboxy-1-pentadecanethiol, carboxy-EG6-undecanethiol, and carboxy-EG6-hexadecanethiol. One of these may be used alone, or a combination of two or more may be used.

—(iii) Product of Reacting Dye Containing Reactive Group with Molecule Containing Hydroxyl Group (Molecule Containing Hydroxyl Group, Thiol Group, and Spacer)—

The reaction product is obtained as a result of reacting (i) the reactive group in the dye containing the reactive group, such as a sulfateethylsulfonyl group, a vinylsulfonyl group, a monochloro-triazynyl group, a monofluoro-triazynyl group, a monopyridinio-triazynyl group, a dichloro-triazinyl group, a difluoromonochloropyrimidinyl group, and a trichloro-pyrimidinyl group with (ii) the hydroxyl group in the molecule containing the hydroxyl group.

The dye containing the reactive group may be selected appropriately in accordance with the purpose without any limitation. Examples include a commercially available reactive dye.

The molecule containing the hydroxyl group may be selected appropriately in accordance with the purpose without any limitation. Examples include 2-mercaptoethanol, 3-mercapto-1-propanol, 1-mercapto-2-propanol, 4-mercapto-1-butanol, 6-mercapto-1-hexanol, 3-mercapto-1-hexanol, 8-mercapto-1-octanol, 9-mercapto-1-nonanol, 11-mercapto-1-undecanol, and 1-thioglycerol. One of these may be used alone, or a combination of two or more may be used.

(Metal Nanowire)

The metal nanowire of this disclosure includes a metal nanowire body (metal filler), and at least a portion of the surface of the metal nanowire body is surface treated with the thiol group-containing colored compound of this disclosure.

As used here, "surface treated with a colored compound" refers to "a color compound contacting (adsorbing on) the metal nanowire body (for example, see FIG. 1)". The colored compound (dye) may contact (adsorb on) the metal nanowire in an agglomerated state.

FIG. 1 is a schematic view illustrating the metal nanowire of this disclosure.

In FIG. 1, at least a portion of the surface 2a of the metal nanowire body 2 in the metal nanowire 1 is coated (surface treated) with a colored compound (dye) 3. In this way, visible light is absorbed by the colored compound (dye) 3 covering at least a portion of the surface 2a of the metal nanowire body 2, and diffuse reflection of light at the surface 2a of the metal nanowire body 2 is prevented.

<Metal Nanowire Body>

The metal nanowire body is constituted by metal and is a minute wire having a diameter on the order of nanometers.

The constituent element of the metal nanowire body may be any metallic element selected appropriately in accordance with the purpose without any limitation. Examples include Ag, Au, Ni, Cu, Pd, Pt, Rh, Ir, Ru, Os, Fe, Co, Sn, Al, Tl, Zn, Nb, Ti, In, W, Mo, Cr, Fe, V, and Ta. One of these may be used alone, or a combination of two or more may be used.

Among these examples, Ag and Cu are preferable due to their high conductivity.

The average minor axis diameter of the metal nanowire body may be selected appropriately in accordance with the purpose without any limitation but is preferably in the range of 1 nm to 500 nm, and more preferably in the range of 10 nm to 100 nm.

If the average minor axis diameter of the metal nanowire body is 1 nm or less, the conductivity of the metal nanowire body degrades, possibly hindering the transparent conductive film that includes the metal nanowires, in which the metal nanowire bodies have been surface treated, from serving as a conductive film. If the average minor axis diameter exceeds 500 nm, the total light transmittance and haze of the transparent conductive film that includes the metal nanowires, in which the metal nanowire bodies have been surface treated, might degrade. Conversely, setting the average minor axis diameter of the metal nanowire body to be within the aforementioned more preferable range is advantageous because such an average minor axis diameter imparts high conductivity and high transparency to the transparent conductive film that includes the metal nanowires in which the metal nanowire bodies have been surface treated.

The average major axis length of the metal nanowire body may be selected appropriately in accordance with the purpose without any limitation but is preferably in the range of greater than 1 μm to 1000 μm or less, more preferably in the range of 10 μm to 300 μm.

If the average major axis length of the metal nanowire body is 1 μm or less, it becomes difficult for metal nanowire bodies to connect, possibly hindering the transparent conductive film that includes the metal nanowires, in which the metal nanowire bodies have been surface treated, from serving as a conductive film. If the average major axis length exceeds 1000 μm, the total light transmittance and haze of the transparent conductive film that includes the metal nanowires, in which the metal nanowire bodies have been surface treated, might degrade, or the dispersibility of the metal nanowires, in which the metal nanowire bodies have been surface treated, in the dispersion liquid used in the formation of the transparent conductive film might degrade. Conversely, setting the average major axis length of the metal nanowire body to be within the aforementioned more preferable range is advantageous because such an average minor axis diameter imparts high conductivity and high transparency to the transparent conductive film that includes the metal nanowires in which the metal nanowire bodies have been surface treated.

The average minor axis diameter and the average major axis length of the metal nanowire body refer to the number average minor axis diameter and the number average major axis length that may be measured by a scanning electron microscope. More specifically, more than 100 metal nanowire bodies are subjected to measurement, and from an image taken by the scanning electron microscope, the projected diameter and the projected area of each nanowire are calculated with use of an image analysis device. The projected diameter is defined as the minor axis diameter. The major axis length is calculated by the following formula.

Major axis length=projected area/projected diameter

The average minor axis diameter is defined by the arithmetic mean value of the minor axis diameters. The average major axis length is defined by the arithmetic mean value of the major axis lengths.

Additionally, the metal nanowire body may be in the form of a wire including beaded metal nanoparticles. In this case, the length is not subject to any limitation.

The coating amount (weight per area) of the metal nanowire body may be selected appropriately in accordance with the purpose without any limitation but is preferably in the range of 0.001 g/m$^2$ to 1.000 g/m$^2$, and more preferably in the range of 0.003 g/m$^2$ to 0.3 g/m$^2$.

If the coating amount of the metal nanowire body is less than 0.001 g/m$^2$, the conductivity of the transparent conductive film might degrade due to insufficient presence of metal nanowire bodies in the metal nanowire layer. If the coating amount exceeds 1.000 g/m$^2$, the total light transmittance and haze of the transparent conductive film might degrade. Conversely, setting the coating amount of the metal nanowire body to be within the aforementioned more preferable range is advantageous because such a coating amount imparts high conductivity and high transparency to the transparent conductive film.

<Method of Manufacturing Metal Nanowires>

The metal nanowires are obtained by mixing a metal nanowire body dispersion liquid and a thiol group-containing colored compound (dye) dispersion liquid. In greater detail, the metal nanowire body dispersion liquid and the thiol group-containing colored compound (dye) dispersion liquid are mixed, and the thiol group-containing colored compound (dye) is then adsorbed on (used to surface treat) the metal nanowire bodies while stirring at a temperature between room temperature and 100° C. for 1 minute to 48 hours. The surface processing may also be followed by a process to remove non-adsorbed thiol group-containing colored compound (dye) using centrifugation, filtering, or the like.

—Metal Nanowire Body Dispersion Liquid—

The metal nanowire body dispersion liquid includes at least the metal nanowire bodies and a solvent. Other components, such as a dispersant and a surfactant, may be included as necessary.

As the solvent, any material in which metal nanowire bodies can disperse to a predetermined concentration may be selected appropriately without any limitation. Examples include the materials described below in the explanation of the dispersion liquid of this disclosure.

The metal nanowire bodies are as described above, and the dispersant is the same as the dispersant described below in the explanation of the dispersion liquid of this disclosure.

—Thiol Group-Containing Colored Compound (Dye) Dispersion Liquid—

The thiol group-containing colored compound (dye) dispersion liquid includes at least a thiol group-containing colored compound (dye) and a solvent. Other components, such as a dispersant and a surfactant, may be included as necessary.

As the solvent, any material in which the thiol group-containing colored compound (dye) can dissolve and/or disperse to a predetermined concentration and which is compatible with the solvent in the metal nanowire dispersion liquid may be selected appropriately without any limitation. Examples include water, acetonitrile, 3-methoxypropionitrile, 3,3-dimethoxypropionitrile ethoxypropionitrile, 3-ethoxypropionitrile, 3,3'-oxydipropionitrile, 3-aminopropionitrile, propionitrile, cyanoacetic acid propyl, 3-methoxypropyl isothiocyanate, 3-phenoxypropionitrile, p-anisidine 3-(phenylmethoxy)propanenitrile, methanol, ethanol, propanol, isopropyl alcohol, n-butanol, 2-butanol, isobutanol, t-butanol, ethylene glycol, tri ethylene glycol, 1-methoxy-ethanol, 1, 1-dimethyl-2-methoxyethanol, 3-methoxy-1-propanol, dimethyl sulfoxide, benzene, toluene, o-xylene, m-xylene, p-xylene, chlorobenzene, dichlorobenzene, butyl acetate, ethyl acetate, hexane, cyclohexane, cyclohexanone, ethyl methyl ketone, acetone, and dimethylformamide. One of these may be used alone, or a combination of two or more may be used. Stating that the "thiol group-containing colored compound (dye) disperses" also includes a state in which "aggregates of the thiol group-containing colored compound (dye) are dispersed".

A solvent that does not swell the binder in the below-described dispersion liquid is preferably selected. The reason is that the use of a solvent that swells the binder causes the thiol group-containing compound (dye) to be incorporated excessively in the binder, possibly deteriorating the transparency of the transparent conductive film.

The thiol group-containing colored compound (dye) is as described above, and the dispersant is the same as the dispersant described below in the explanation of the dispersion liquid of this disclosure.

The concentration of the thiol group-containing colored compound (dye) in the thiol group-containing colored compound (dye) dispersion liquid may be selected appropriately in accordance with the purpose without any limitation, but in order to improve the rate of adsorption of the thiol group-containing colored compound (dye) on the metal nanowire body, the concentration is preferably 0.01% by mass or higher.

(Dispersion Liquid)

The dispersion liquid of this disclosure includes at least the metal nanowires of this disclosure, a solvent, and a binder, and may include a dispersant and other additives as necessary. As described above, the metal nanowires of this disclosure include metal nanowire bodies, and at least a portion of the surface of the metal nanowire body is surface treated with the thiol group-containing colored compound (dye) of this disclosure. The thiol group-containing colored compound (dye) may adsorb on the metal nanowire in an agglomerated state.

As the dispersion liquid used to manufacture the transparent conductive film of this disclosure as described below, a "dispersion liquid including metal nanowire bodies, a binder, and a solvent" and a "thiol group-containing colored compound (dye) dispersion liquid" may be used together instead of using the "dispersion liquid including the metal nanowires of this disclosure, a solvent, and a binder". The metal nanowire bodies and the thiol group-containing colored compound (dye) are as described above.

Furthermore, as the dispersion liquid used to manufacture the transparent conductive film of this disclosure as described below, a "dispersion liquid including metal nanowire bodies, a thiol group-containing colored compound (dye), a binder, and a solvent" may be used instead of using the "dispersion liquid including the metal nanowires of this disclosure, a solvent, and a binder". The metal nanowire bodies and the thiol group-containing colored compound (dye) are as described above.

The dispersion method for the dispersion liquid may be selected appropriately in accordance with the purpose without any limitation. Suitable examples include stirring, ultrasonic dispersion, bead dispersion, kneading, a homogenizer process, and a pressurized dispersion process.

The amount of the metal nanowire bodies in the metal nanowires within the dispersion liquid may be selected appropriately in accordance with the purpose without any limitation but is preferably in the range of 0.01 parts by mass to 10.00 parts by mass per 100 parts by mass of the dispersion liquid.

The amount of the metal nanowire bodies in the metal nanowires being less than 0.01 parts by mass might result in failure to obtain a satisfactory coating amount (0.001 g/m$^2$ to 1.000 g/m$^2$) of the metal nanowire bodies in the final transparent conductive film, whereas the amount being greater than 10.00 parts by mass might cause the dispersibility of the metal nanowires to degrade.

<Binder>

The binder serves to disperse the metal nanowires and/or the metal nanowire bodies.

The binder may be selected appropriately in accordance with the purpose without any limitation. Examples include a known, transparent natural polymeric resin and synthetic polymeric resin. The binder may also be a thermoplastic resin or a thermosetting (or a photo curable) resin which may be cured by heat, light, electron beams, or radiation. One of these may be used alone, or a combination of two or more may be used.

The thermoplastic resin may be selected appropriately in accordance with the purpose without any limitation. Examples include polyvinyl chloride, a vinyl chloride-vinyl acetate copolymer, polymethyl methacrylate, cellulose nitrate, chlorinated polyethylene, chlorinated polypropylene, vinylidene fluoride, ethyl cellulose, hydroxypropylmethyl cellulose, hydroxypropyl cellulose, polyvinyl alcohol, and polyvinyl pyrrolidone.

The thermosetting (or photo curable) resin may be selected appropriately in accordance with the purpose without any limitation. Examples include melamine acrylate, urethane acrylate, isocyanate, an epoxy resin, a polyimide resin, and a silicon resin such as acrylic-modified silicate. Further examples include a polymer containing a photosensitive group, such as an azido group and a diazirine group, in at least one of its main chain and side chain.

<Solvent>

Any solvent in which the metal nanowires and/or the metal nanowire bodies disperse may be selected appropriately in accordance with the purpose without any limitation. Examples include water; alcohol, such as methanol, ethanol, n-propanol, i-propanol, n-butanol, i-butanol, sec-butanol, and tert-butanol; anone, such as cyclohexanone and cyclopentanone; amide, such as N,N-dimethylformamide (DMF); and sulfide, such as dimethyl sulfoxide (DMSO). One of these may be used alone, or a combination of two or more may be used.

In order to suppress uneven drying and cracks in the dispersion film formed using the dispersion liquid, a high boiling point solvent can also be further added to the dispersion liquid. Doing so allows control of the speed at which the solvent evaporates from the dispersion liquid.

The high boiling point solvent may be selected appropriately in accordance with the purpose without any limitation. Examples include butyl cellosolve, diacetone alcohol, butyl triglycol, propylene glycol monomethyl ether, propylene glycol monoethyl ether, ethylene glycol monoethyl ether, ethylene glycol monopropyl ether, ethylene glycol monoisopropyl ether, diethylene glycol monobutyl ether, diethylene glycol monoethyl ether, diethylene glycol monomethyl ether, diethylene glycol diethyl ether, dipropylene glycol monomethyl ether, tripropylene glycol monomethyl ether, propylene glycol monobutyl ether, propylene glycol isopropyl ether, dipropylene glycol isopropyl ether, tripropylene glycol isopropyl ether, and methyl glycol. One of these may be used alone, or a combination of two or more may be used.

<Dispersant>

The dispersant may be selected appropriately in accordance with the purpose without any limitation. Examples include polyvinylpyrrolidone (PVP); a compound containing an amino group, such as polyethyleneimine; and a compound which may be adsorbed on a metal and which contains a functional group, such as a sulfo group (including a sulfonate salt), a sulfonyl group, a sulfonamide group, a carboxylic acid group (including a carboxylate salt), an amide group, a phosphate group (including a phosphate and a phosphate ester), a phosphino group, a silanol group, an epoxy group, an isocyanate group, a cyano group, a vinyl group, a thiol group, and a carbinol group. One of these may be used alone, or a combination of two or more may be used.

The dispersant may also be adsorbed on the surface of the metal nanowires or the metal nanowire bodies. This enhances the dispersibility of the metal nanowires or the metal nanowire bodies.

When the dispersant is added in the dispersion liquid, the amount of the dispersant is preferably set so that the conductivity of the final transparent conductive film does not degrade. By doing so, the dispersant may adsorb on the metal nanowires or the metal nanowire bodies in an amount that does not cause the conductivity of the transparent conductive film to degrade.

<Other Additives>

The other additives may be selected appropriately in accordance with the purpose without any limitation. Examples include a thickening agent and a surfactant.

(Transparent Conductive Film)

The transparent conductive film of this disclosure includes at least the metal nanowires of this disclosure (i.e. (i) metal nanowire bodies and (ii) a thiol group-containing colored compound adsorbed on the metal nanowire bodies) and may include other components as necessary.

Figure 2:
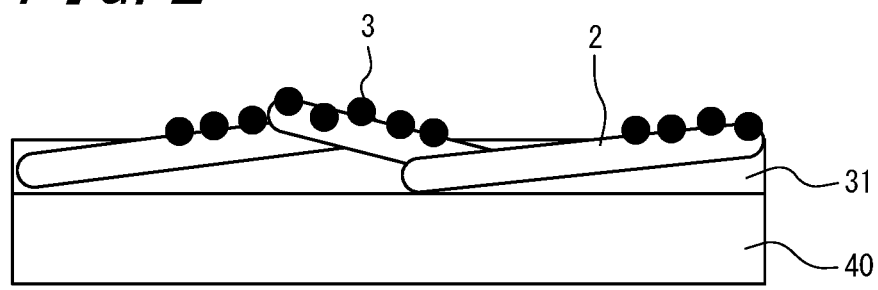
FIG. 2 is a schematic view of Embodiment 1 of a transparent electrode that includes the transparent conductive film of this disclosure.
Figure 3:
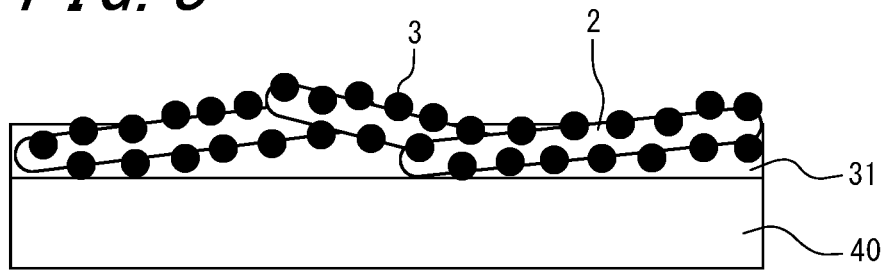
FIG. 3 is a schematic view of Embodiment 2 of a transparent electrode that includes the transparent conductive film of this disclosure.
Figure 4:
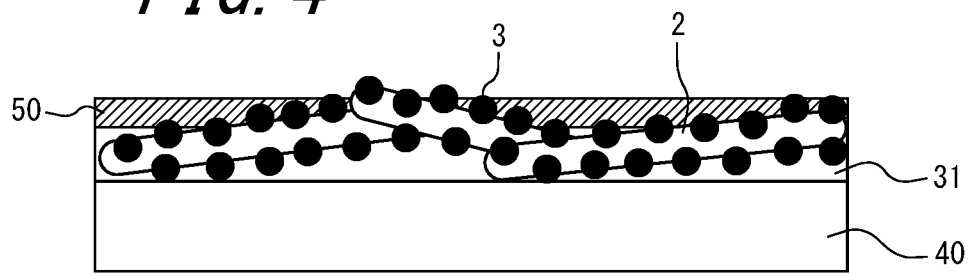
FIG. 4 is a schematic view of Embodiment 3 of a transparent electrode that includes the transparent conductive film of this disclosure.
Figure 5:
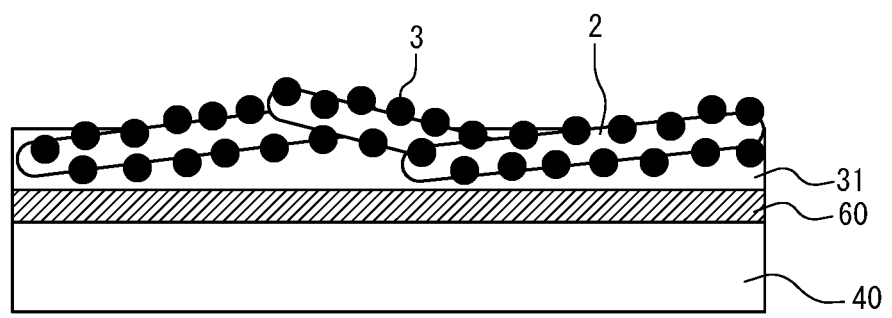
FIG. 5 is a schematic view of Embodiment 4 of a transparent electrode that includes the transparent conductive film of this disclosure.
Figure 6:
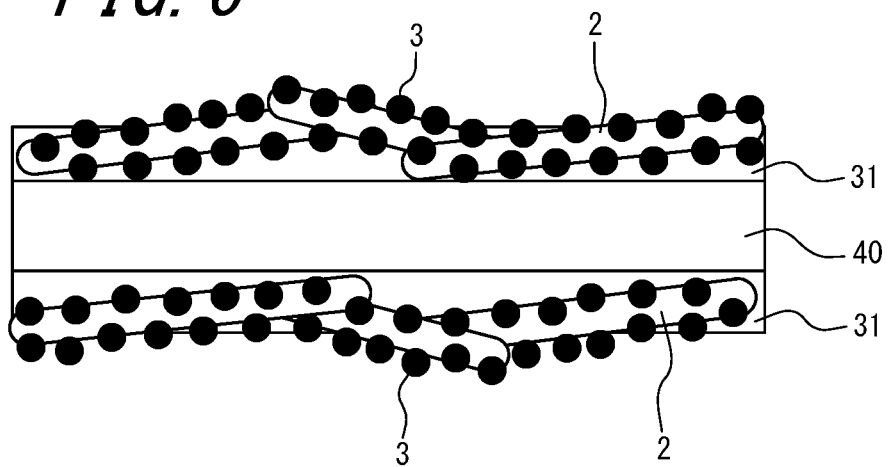
FIG. 6 is a schematic view of Embodiment 5 of a transparent electrode that includes the transparent conductive film of this disclosure.

A transparent electrode including the transparent conductive film of this disclosure may be selected appropriately in accordance with the purpose without any limitation, as long as the transparent electrode includes a transparent conductive film containing the metal nanowires of this disclosure (i.e. (i) metal nanowire bodies and (ii) a thiol group-containing colored compound adsorbed on the metal nanowire bodies). Examples include (i) the case illustrated in FIG. 2, in which a colored compound (dye) 3 is adsorbed on only portions of metal nanowire bodies 2 that are exposed from a binder layer 31 (the colored compound (dye) 3 may be adsorbed on the metal nanowire bodies 2 in an agglomerated state, and may be present on part of the surface of the binder layer 31 or in the binder layer 31), (ii) the case illustrated in FIG. 3, in which the colored compound (dye) 3 is adsorbed on the surface of the metal nanowire bodies 2 (the colored compound (dye) 3 may be adsorbed on the metal nanowire bodies 2 in an agglomerated state, and may be present on part of the surface of the binder layer 31 or in the binder layer 31), (iii) the case illustrated in FIG. 4, in which an overcoat layer 50 is formed on the binder layer 31, (iv) the case illustrated in FIG. 5, in which an anchor layer 60 is formed between the binder layer 31 and a substrate 40, (v) the case illustrated in FIG. 6, in which binder layers 31 are formed on both sides of the substrate 40, each binder layer 31 including the metal nanowire bodies 2 on which the colored compound (dye) 3 is adsorbed, and (vi) any appropriate combination of examples (i) to (v).

The transparent conductive film of this disclosure may further include metal nanowire bodies that are not surface treated with a thiol group-containing colored compound. As used here, "metal nanowire bodies that are not surface treated with a thiol group-containing colored compound" refer to "metal nanowire bodies that are not surface treated at all" and/or to "metal nanowire bodies that are surface treated with a compound other than the thiol group-containing colored compound of this disclosure".

—Substrate—

The substrate may be selected appropriately in accordance with the purpose without any limitation but is preferably a transparent substrate constituted by a material, such as an inorganic material or a plastic material, that transmits visible light. The transparent substrate has a thickness required for the transparent electrode that includes the transparent conductive film. For example, the transparent substrate may be in the form of a film (a sheet) which is thin enough to bend flexibly or may be in the form of a plate with a thickness that combines appropriate flexibility and rigidity.

The inorganic material may be selected appropriately in accordance with the purpose without any limitation. Examples include quartz, sapphire, and glass.

The plastic material may also be selected appropriately in accordance with the purpose without any limitation. Examples include a known polymeric material, such as triacetyl cellulose (TAC), polyester (TPEE), polyethylene terephthalate (PET), polyethylene naphthalate (PEN), polyimide (PI), polyamide (PA), aramid, polyethylene (PE), polyacrylate, polyethersulfone, polysulfone, polypropylene (PP), diacetyl cellulose, polyvinyl chloride, acrylic resins (PMMA), polycarbonate (PC), epoxy resins, urea resins, urethane resins, melamine resins, and cycloolefin polymers (COP). When such a plastic material is used to constitute the transparent substrate, the thickness of the transparent substrate is preferably in the range of 5 µm to 500 µm from the viewpoint of productivity, but the thickness is not limited to this range.

—Overcoat Layer—

It is important that the overcoat layer transmit visible light. The overcoat layer may be constituted by a polyacryl-based resin, a polyamide-based resin, a polyester-based resin, or a cellulose-based resin. Alternatively, the overcoat layer may be constituted by a hydrolysis product or a dehydration condensation product of a metal alkoxide. Furthermore, the overcoat layer is to have a thickness that does not adversely affect the transmittance with respect to visible light. The overcoat layer may also have at least one function selected from the function group consisting of a hard coat function, an anti-glare function, an anti-reflection function, an anti-Newton ring function, an anti-blocking function, and the like.

—Anchor Layer—

As long as the anchor layer allows stronger adhesion between the substrate and the binder layer, the anchor layer may be selected appropriately in accordance with the purpose without any limitation.

—Method of Manufacturing Transparent Conductive Film—

—Embodiment 1—

The following describes Embodiment 1 of a method of manufacturing the transparent conductive film of this disclosure.

The method of manufacturing the transparent conductive film of this disclosure includes at least a dispersion film forming step, a curing step, and a surface treatment step, and also includes, as necessary, a calendering step, a rinsing and drying step, an overcoat layer forming step, a pattern electrode forming step, and other steps.

Embodiment 1 of the method of manufacturing the transparent conductive film of this disclosure includes, for example, the dispersion film forming step, the curing step, the calendering step, the surface treatment step, and the rinsing and drying step in this order.

—Dispersion Film Forming Step—

The dispersion film forming step is a step to form a dispersion film (metal nanowire film) on the substrate using a dispersion liquid including metal nanowire bodies, a binder, and a solvent.

The metal nanowire bodies, the binder, and the solvent are all as described above in the explanation of the dispersion liquid of this disclosure.

The method of forming the dispersion film may be selected appropriately in accordance with the purpose without any limitation but is preferably a wet film forming method from the viewpoints of physical properties, convenience, and manufacturing cost.

The wet film forming method may be selected appropriately in accordance with the purpose without any limitation. Examples include a known method such as a coating method, a spraying method, and a printing method.

The coating method may be selected appropriately in accordance with the purpose without any limitation. Examples include a micro-gravure coating method, a wire bar coating method, a direct gravure coating method, a die coating method, a dipping method, a spray coating method, a reverse roll coating method, a curtain coating method, a comma coating method, a knife coating method, and a spin coating method.

The spray method may be selected appropriately in accordance with the purpose without any limitation.

The printing method may be selected appropriately in accordance with the purpose without any limitation. Examples include anastatic printing, offset printing, gravure printing, intaglio printing, rubber plate printing, screen printing, and ink-jet printing.

—Curing Step—

Figure 7:
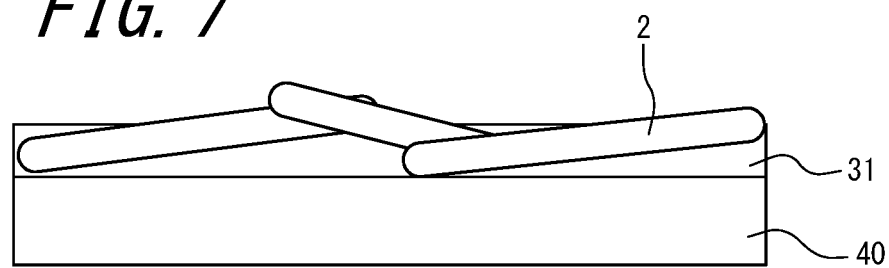
FIG. 7 is a schematic view of a cured product obtained in the curing step in Embodiment 1 of a method of manufacturing the transparent conductive film of this disclosure.

The curing step is a step to cure the dispersion film formed on the substrate to obtain a cured product (the binder layer 31 including the metal nanowire bodies 2 in FIG. 7).

In the curing step, the solvent in the dispersion film formed on the substrate is first removed by drying. The removal of the solvent by drying may involve natural drying or heat drying. The drying is followed by a curing treatment of the uncured binder, and the metal nanowires are thus dispersed in the cured binder. The curing treatment may be performed by heating and/or active energy ray radiation.

—Surface Treatment Step—

Figure 8:
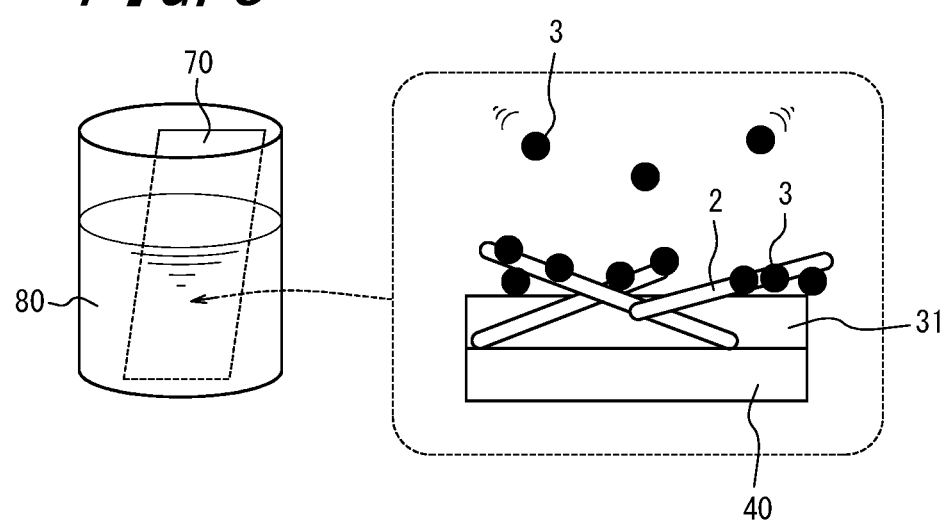
FIG. 8 is a schematic view illustrating a surface treatment step (when immersing the cured product in a colored compound (dye) dispersion liquid) in Embodiment 1 of a method of manufacturing the transparent conductive film of this disclosure.

The surface treatment step is a step (i) to soak the cured product 70 obtained by curing the dispersion film in a colored compound (dye) dispersion liquid 80 including a thiol group-containing colored compound (dye) 3 and a solvent, as illustrated in FIG. 8, or (ii) to coat or print a colored compound (dye) dispersion liquid including a thiol group-containing colored compound (dye) 3 and a solvent onto the cured product obtained by curing the dispersion film.

Figure 9:
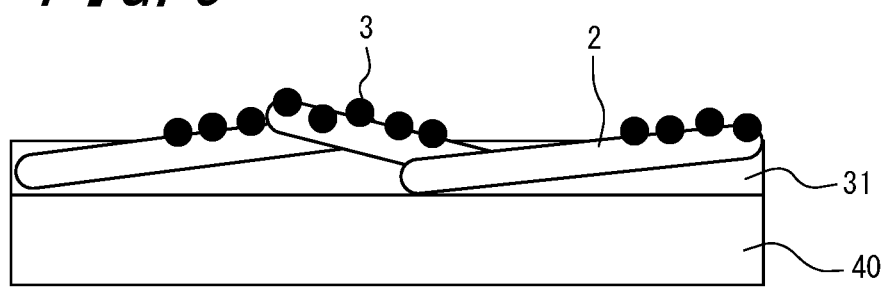
FIG. 9 is a schematic view of the cured product after the surface treatment step in Embodiment 1 of a method of manufacturing the transparent conductive film of this disclosure.

In this way, a layer is formed to include metal nanowires in which the thiol group-containing colored compound (dye) 3 in the colored compound (dye) dispersion liquid is adsorbed on the metal nanowire bodies 2 dispersed in the cured binder layer 31, as illustrated in FIG. 9. In this example, surface treatment of the portions of the metal nanowire bodies 2 that are exposed from the binder layer 31 is prioritized. During this surface treatment, the thiol group-containing colored compound (dye) 3 in the colored compound (dye) dispersion liquid and the metal material constituting the metal nanowire bodies 2 are chemically adsorbed (by covalent bonding, coordination bonding, ionic bonding, or hydrogen bonding).

Specific examples of this surface treatment include (i) a soaking method to soak the dispersion film, in which the metal nanowire bodies 2 are dispersed, in a colored compound (dye) dispersion liquid, and (ii) a coating method or printing method to form a liquid film of a colored compound (dye) dispersion liquid on the dispersion film.

In the case of applying the soaking method, a colored compound (dye) dispersion liquid of an amount in which the dispersion film can sufficiently soak is prepared, and the dispersion film is then soaked in the colored compound (dye) dispersion liquid for 0.1 seconds to 48 hours. At this time, the rate of adsorption of the colored compound (dye) on the metal nanowire bodies can be raised by performing at least one of heating and ultrasonic treatment. After soaking, as necessary, the dispersion film is washed with a good solvent for the colored compound (dye) to remove the non-adsorbed colored compound (dye) remaining on the dispersion film.

When applying the coating method, for example any of a micro-gravure coating method, a wire bar coating method, a direct gravure coating method, a die coating method, a dipping method, a spray coating method, a reverse roll coating method, a curtain coating method, a comma coating method, a knife coating method, and a spin coating method may be selected appropriately to form a liquid film of the colored compound (dye) dispersion liquid on the dispersion film.

When applying the printing method, for example any of the following methods may be selected appropriately to form a liquid film of the colored compound (dye) dispersion liquid on the dispersion film: anastatic printing, offset printing, gravure printing, intaglio printing, rubber plate printing, ink-jet printing, and screen printing.

When applying the coating method or the printing method, the rate of adsorption of the colored compound (dye) on the metal nanowire bodies can be raised by performing at least one of heating and ultrasonic treatment in a state in which a liquid film with a certain amount of the colored compound (dye) dispersion liquid has been formed on the dispersion film. Once a certain amount of time has elapsed after formation of the liquid film of the colored compound (dye) dispersion liquid, as necessary, the dispersion film is washed with a good solvent for the colored compound (dye) to remove the non-adsorbed colored compound (dye) remaining on the dispersion film.

The formation of a liquid film with a certain amount of the colored compound (dye) dispersion liquid need not be accomplished by one iteration of the formation process. Rather, the liquid film may be formed by repeating the above-described liquid film forming step and washing step multiple times.

—Calendering Step—

The calendering treatment is a step performed (i) between the curing step and the surface treatment step, (ii) after the rinsing and drying step, or (iii) after the overcoat layer forming step and is a step to increase smoothness of the surface and give a glossy appearance to the surface.

Such calendering treatment reduces the sheet resistance of the resulting transparent conductive film.

—Rinsing and Drying Step—

The rinsing and drying step is a step, after the surface treatment step, to rinse the surface treated cured product with a predetermined solvent and then dry the cured product. This step completes the manufacturing of a transparent conductive film that includes metal nanowires and is formed on a substrate. The drying may involve natural drying or heat drying.

—Overcoat Layer Forming Step—

The overcoat layer forming step is performed after the formation of the cured product of the dispersion liquid and is a step to form the overcoat layer on the cured product. The overcoat layer forming step may be performed after the rinsing and drying.

The overcoat layer may be formed by, for example, applying a coating liquid, containing a predetermined material for forming the overcoat layer, to the cured product and curing the applied coating liquid.

—Pattern Electrode Forming Step—

The pattern electrode forming step is performed after the rinsing and drying step and is a step to form a pattern electrode by applying a known photolithography process. This makes the transparent conductive film of this disclosure applicable to a sensor electrode for a capacitive touch panel. When the curing treatment performed in the curing step involves active energy ray radiation, the curing treatment may include mask exposure/development to form the pattern electrode.

Figure 10:
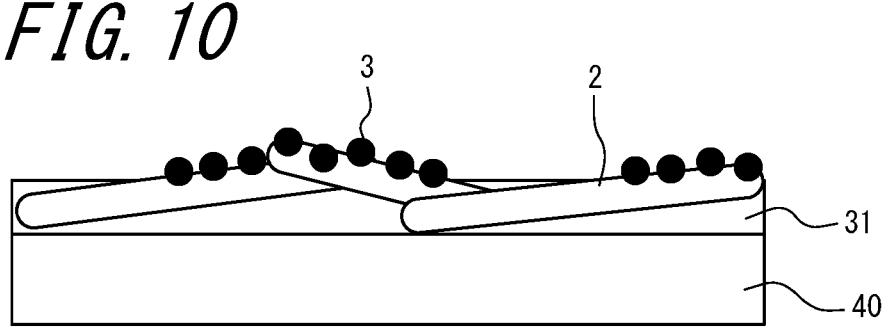
FIG. 10 is a schematic view (part 1) of the transparent conductive film obtained in Embodiment 1 of a method of manufacturing the transparent conductive film of this disclosure.
Figure 11:
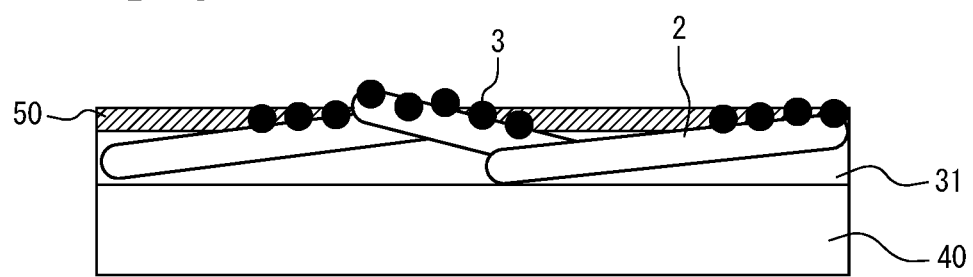
FIG. 11 is a schematic view (part 2) of the transparent conductive film obtained in Embodiment 1 of a method of manufacturing the transparent conductive film of this disclosure.

Examples of the transparent conductive film obtained with Embodiment 1 of a method of manufacturing the transparent conductive film of this disclosure include (i) the case illustrated in FIG. 10, in which a thiol group-containing colored compound (dye) 3 is adsorbed on only portions of the metal nanowire bodies 2 that are exposed from the binder layer 31 (the thiol group-containing colored compound (dye) 3 may be adsorbed on the metal nanowire body 2 in an agglomerated state, and may be present on part of the surface of the binder layer 31 or in the binder layer 31), and (ii) the case illustrated in FIG. 11, in which an overcoat layer 50 is formed on the binder layer 31 in FIG. 10.

According to Embodiment 1 of the method of manufacturing the transparent conductive film of this disclosure, the metal nanowires can more reliably be brought into contact for conduction.

—Embodiment 2—

The following describes Embodiment 2 of a method of manufacturing the transparent conductive film of this disclosure. Portions that overlap with the description of Embodiment 1 of a method of manufacturing the transparent conductive film of this disclosure are omitted.

The method of manufacturing the transparent conductive film of this disclosure includes at least the dispersion film forming step and the curing step and also includes, as necessary, the calendering step, the overcoat layer forming step, the pattern electrode forming step, and other steps.

Embodiment 2 of the method of manufacturing the transparent conductive film of this disclosure includes, for example, the dispersion film forming step, the curing step, and the calendering step in this order.

—Dispersion Film Forming Step—

The dispersion film forming step is a step to form the dispersion film on the substrate using (i) a dispersion liquid containing metal nanowires, a binder, and a solvent, or (ii) a dispersion liquid containing a thiol group-containing colored compound (dye), metal nanowire bodies, a binder, and a solvent.

The metal nanowires, the thiol group-containing colored compound (dye), the metal nanowire bodies, the binder, and the solvent are all as described above in the explanation of the dispersion liquid of this disclosure.

—Curing Step—

The curing step is a step to cure the dispersion film formed on the substrate to obtain a cured product.

—Calendering Step—

The calendering step is performed (i) after the curing step, or (ii) after the overcoat layer forming step.

—Overcoat Layer Forming Step—

The overcoat layer forming step is performed after the formation of the cured product of the dispersion film and is a step to form the overcoat layer on the cured product.

—Pattern Electrode Forming Step—

The pattern electrode forming step is performed after formation of the transparent conductive film on the substrate and is a step to form a pattern electrode by applying a known photolithography process. This makes the transparent conductive film of this disclosure applicable to a sensor electrode for a capacitive touch panel. When the curing treatment performed in the curing step involves active energy ray radiation, the curing treatment may include mask exposure/development to form the pattern electrode.

Figure 12:
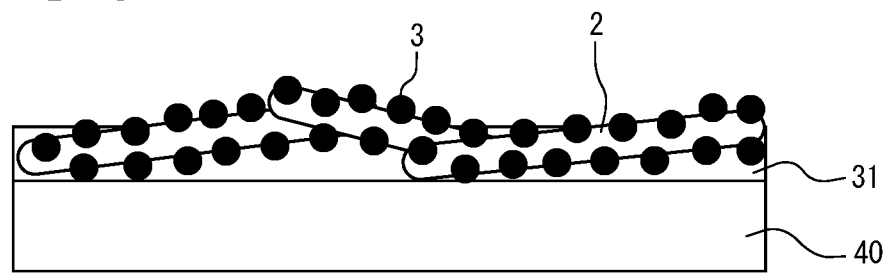
FIG. 12 is a schematic view (part 1) of the transparent conductive film obtained in Embodiment 2 of a method of manufacturing the transparent conductive film of this disclosure.
Figure 13:
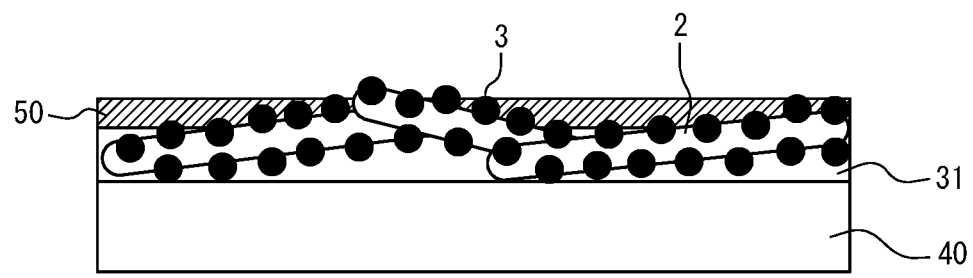
FIG. 13 is a schematic view (part 2) of the transparent conductive film obtained in Embodiment 2 of a method of manufacturing the transparent conductive film of this disclosure.

Examples of the transparent conductive film obtained with Embodiment 2 of a method of manufacturing the transparent conductive film of this disclosure include (i) the case illustrated in FIG. 12, in which a thiol group-containing colored compound (dye) 3 is adsorbed on the surface of the metal nanowire bodies 2 (the thiol group-containing colored compound (dye) 3 may be adsorbed on the metal nanowire body 2 in an agglomerated state, and may be present on part of the surface of the binder layer 31 or in the binder layer 31), and (ii) the case illustrated in FIG. 13, in which an overcoat layer 50 is formed on the binder layer 31 in FIG. 12.

(Information Input Device)

The information input device of this disclosure includes at least a known transparent substrate and the transparent conductive film of this disclosure and also includes, as necessary, other known members (for example as described in Japanese Patent No. 4893867).

The information input device may be selected appropriately in accordance with the purpose without any limitation. Examples include a touch panel as disclosed in Japanese Patent No. 4893867.

(Electronic Apparatus)

The electronic apparatus of this disclosure includes at least a known display panel and the transparent conductive film of this disclosure and also includes, as necessary, other known members (as described in Japanese Patent No. 4893867).

The electronic apparatus may be selected appropriately in accordance with the purpose without any limitation. Examples include a television, a digital camera, a notebook personal computer, a video camera, or a mobile terminal device as disclosed in Japanese Patent No. 4893867.

EXAMPLES

This disclosure will be explained below in greater detail through Examples and Comparative Examples. However, this disclosure is not limited in any way to these Examples.

Synthesis Example 1

To a 100 mL aqueous solution of a metal complex hydrochloric acid dye Lanyl Black BG E/C (Structural Formula (1) below, manufactured by Okamoto Dyestuff Co., Ltd.) (concentration: 0.00564 mol/L), a 100 mL aqueous solution of 2 molar equivalents of 2-aminoethanethiol hydrochloride (Structural Formula (2) below) were added. After mixing and then irradiating with ultrasound for 1 to 2 hours, the mixture was left standing for approximately 12 hours. Subsequently, a solid was collected by filtering, and after being washed with pure water, the solid was vacuum dried, thereby synthesizing a black dye A.

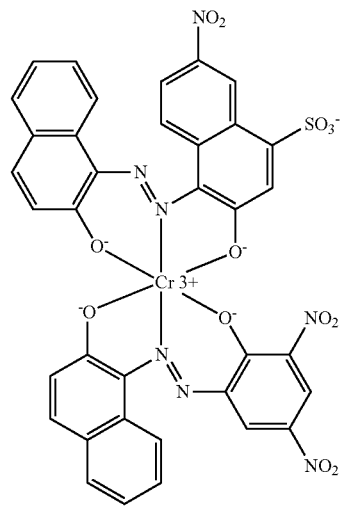

Structural Formula (1)

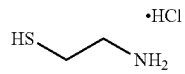

Structural Formula (2)

Synthesis Example 2

A black dye B was synthesized in a similar way to Synthesis Example 1, except that instead of using 2-aminoethanethiol hydrochloride (Structural Formula (2) above) as in Synthesis Example 1, 6-amino-1-hexanethiol hydrochloride (Structural Formula (3) below) was used.

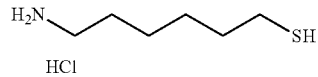

Structural Formula (3)

Synthesis Example 3

A black dye C was synthesized in a similar way to Synthesis Example 1, except that instead of using 2-aminoethanethiol hydrochloride (Structural Formula (2) above) as in Synthesis Example 1, 11-amino-1-undecanethiol hydrochloride (Structural Formula (4) below) was used.

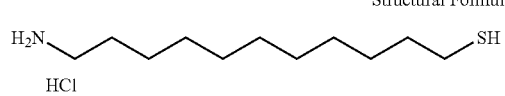

Structural Formula (4)

Synthesis Example 4

A black dye D was synthesized in a similar way to Synthesis Example 1, except that instead of using 2-aminoethanethiol hydrochloride (Structural Formula (2) above) as in Synthesis Example 1, 16-amino-1-hexadecanethiol hydrochloride (Structural Formula (5) below) was used.

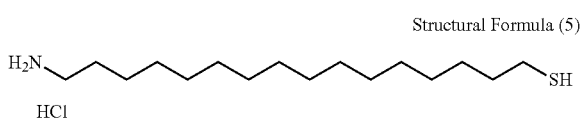 [SMILES: NCCCCCCCCCCCCCCCCS ; Cl]

Structural Formula (5)

Synthesis Example 5

A black dye E was synthesized in a similar way to Synthesis Example 1, except that instead of using 2-aminoethanethiol hydrochloride (Structural Formula (2) above) as in Synthesis Example 1, 4-pyridine ethanethiol hydrochloride (Structural Formula (6) below) was used.

Structural Formula (6)

Synthesis Example 6

A black dye F was synthesized in a similar way to Synthesis Example 1, except that instead of using two molar equivalents of 2-aminoethanethiol hydrochloride (Structural Formula (2) above) as in Synthesis Example 1, one molar equivalent of 2,5-diamino-1,4-benzenedithiol dihydrochloride (Structural Formula (7) below) was used.

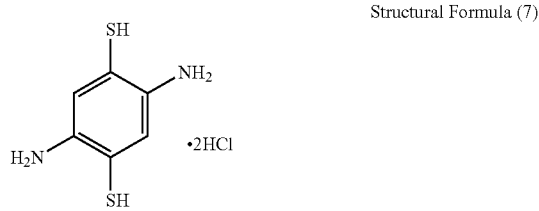

Structural Formula (7)

Comparative Example 1

<Preparation of Silver Nanowire Ink (Dispersion Liquid)>
Silver nanowire ink with the following composition was prepared.
(1) Metal nanowires: silver nanowires (AgNW-25, manufactured by Seashell Technology, LLC, average diameter of 25 nm, average length of 23 μm) in an amount of 0.065 parts by mass
(2) Binder: water-soluble photo-sensitive resin (BIOSURFINE-AWP, manufactured by Toyo Gosei Co., Ltd.), in an amount of 0.13 parts by mass
(3) Solvent: (i) water in an amount of 89.805 parts by mass, (ii) 1-propanol in an amount of 10 parts by mass
<Formation of Silver Nanowire Transparent Electrode (Silver Nanowire Transparent Conductive Film)>
The silver nanowire transparent electrode was formed by the following procedure.
First, the prepared silver nanowire ink (dispersion liquid) was coated onto the transparent substrate (U34, PET: manufactured by Toray Industries, Inc., thickness of 125 μm) using a coil bar (count 10) to form a silver nanowire dispersion film. At this time, the coating amount of the silver nanowires was approximately 0.015 $g/m^2$.

Subsequently, in atmospheric air, hot air was blown from a dryer onto the coated surface to dry and remove the solvent included in the silver nanowire dispersion film.

By irradiating the transparent conductive film (silver nanowire layer) with ultraviolet rays emitted from a metal halide lamp at a cumulative amount of light of 200 $mJ/cm^2$ in atmospheric air, the binder was then cured.

Figure 14:
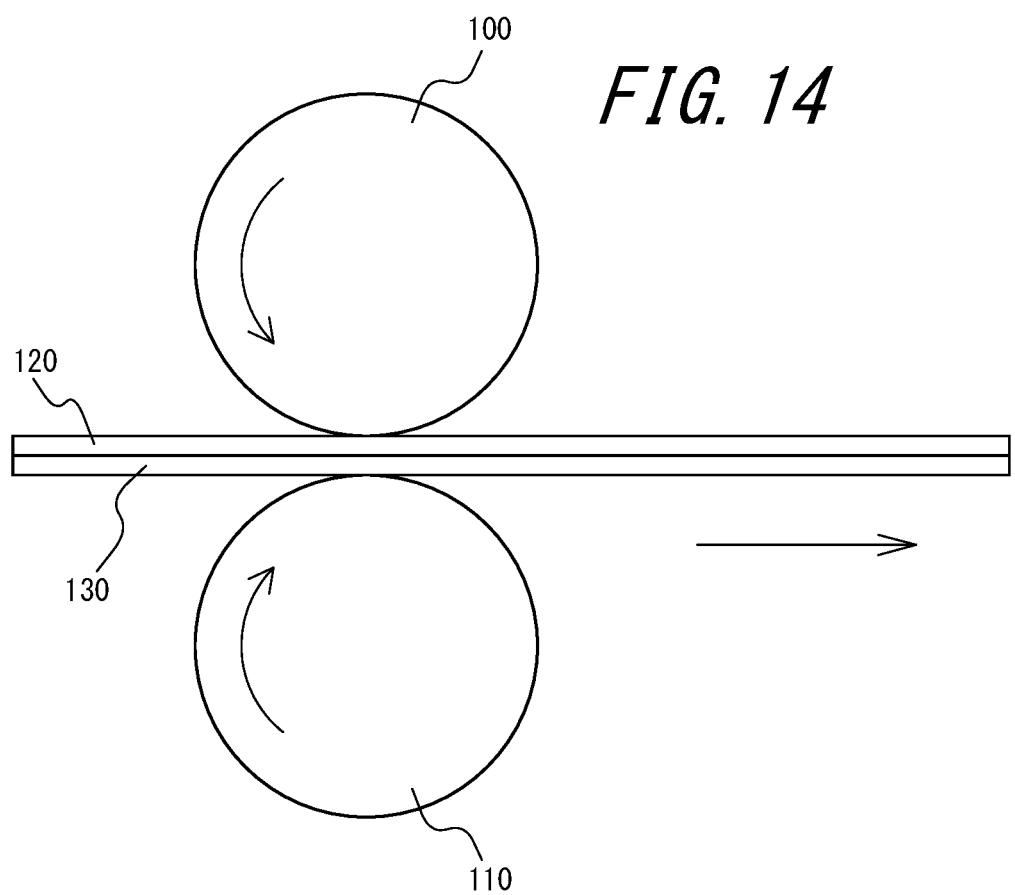
FIG. 14 is a schematic view of a calendering processor used in the Examples of this application.

Next, by using a calendering processor including a cylindrical press roll and a back roll (see FIG. 14), calendering processing (nip width of 1 mm, load of 4 kN, and speed of 1 m/min) was performed.

The sheet resistance was measured by placing the measurement probe of a manual type non-damaging resistance measurement instrument (EC-80P, manufactured by Napson Corporation) into contact with the surface of the silver nanowire dispersion film, measuring the resistance at any three locations on the transparent conductive film (silver nanowire layer), and taking the average as the sheet resistance. The sheet resistance was 100 Ω/sq.

Example 1

A 0.2% by mass ethanol solution of the dye A synthesized in Synthesis Example 1 was prepared. The silver nanowire transparent electrode prepared in Comparative Example 1 was soaked in this ethanol solution at 80° C. for 30 minutes. Subsequently, the silver nanowire transparent electrode was removed, rinsed in ethanol, and dried with an air blower to prepare a silver nanowire transparent electrode that was surface treated with the dye A. Furthermore, as in Comparative Example 1, the sheet resistance was measured (Table 1).

Example 2

A silver nanowire transparent electrode that was surface treated with the dye B was prepared in a similar way to Example 1, except that instead of using the dye A synthesized in Synthesis Example 1 as in Example 1, the dye B synthesized in Synthesis Example 2 was used. The sheet resistance was then measured (Table 1).

Example 3

A silver nanowire transparent electrode that was surface treated with the dye C was prepared in a similar way to Example 1, except that instead of using the dye A synthesized in Synthesis Example 1 as in Example 1, the dye C synthesized in Synthesis Example 3 was used. The sheet resistance was then measured (Table 1).

Example 4

A silver nanowire transparent electrode that was surface treated with the dye D was prepared in a similar way to Example 1, except that instead of using the dye A synthesized in Synthesis Example 1 as in Example 1, the dye D synthesized in Synthesis Example 4 was used. The sheet resistance was then measured (Table 1).

Comparative Example 2

A silver nanowire transparent electrode that was surface treated with the dye E was prepared in a similar way to Example 1, except that instead of using the dye A synthesized in Synthesis Example 1 as in Example 1, the dye E synthesized in Synthesis Example 5 was used. The sheet resistance was then measured (Table 1).

Comparative Example 3

A silver nanowire transparent electrode that was surface treated with the dye F was prepared in a similar way to Example 1, except that instead of using the dye A synthesized in Synthesis Example 1 as in Example 1, the dye F synthesized in Synthesis Example 6 was used. The sheet resistance was then measured (Table 1).

Comparative Example 4

<Preparation of Silver Nanowire Ink (Dispersion Liquid)>
Silver nanowire ink with the following composition was prepared.
(1) Metal nanowires: silver nanowires (AgNW-25, manufactured by Seashell Technology, LLC, average diameter of 25 nm, average length of 23 μm) in an amount of 0.045 parts by mass
(2) Binder: hydroxypropylmethyl cellulose (manufactured by Aldrich Corporation, a 2% aqueous solution thereof having a viscosity of 80 cP to 120 cP at 20° C. (literature data)) in an amount of 0.09 parts by mass
(3) Cross-linking agent: organic titanium compound (Orgatix TC-400, manufactured by Matsumoto Fine Chemical Co. Ltd.) in an amount of 0.009 parts by mass
(4) Solvent: (i) water in an amount of 88.965 parts by mass, (ii) 1-propanol in an amount of 10 parts by mass, (iii) isopropanol in an amount of 0.891 parts by mass
<Preparation of Silver Nanowire Transparent Electrode>
The silver nanowire transparent electrode was formed by the following procedure.
First, the prepared silver nanowire ink (dispersion liquid) was coated onto the transparent substrate (U34, PET: manufactured by Toray Industries, Inc., thickness of 125 μm) using a coil bar (count 10) to form a silver nanowire dispersion film. At this time, the coating amount of the silver nanowires was approximately 0.01 g/m$^2$.

Subsequently, in atmospheric air, hot air was blown from a dryer onto the coated surface to dry and remove the solvent included in the silver nanowire dispersion film.

The result was then subjected to heat curing treatment for 5 minutes in an oven at 120° C.

Next, by using a calendering processor including a cylindrical press roll and a back roll (see FIG. 14), calendering processing (nip width of 1 mm, load of 4 kN, and speed of 1 m/min) was performed.

The sheet resistance was measured by placing the measurement probe of a manual type non-damaging resistance measurement instrument (EC-80P, manufactured by Napson Corporation) into contact with the surface of the silver nanowire dispersion film, measuring the resistance at any three locations on the transparent conductive film (silver nanowire layer), and taking the average as the sheet resistance. The sheet resistance was 100 Ω/sq.

Example 5

A 0.2% by mass ethanol solution of the dye A synthesized in Synthesis Example 1 was prepared. The silver nanowire transparent electrode prepared in Comparative Example 4 was soaked in this ethanol solution at 80° C. for 30 minutes. Subsequently, the silver nanowire transparent electrode was removed, rinsed in ethanol, and dried with an air blower to prepare a silver nanowire transparent electrode that was surface treated with the dye A. Furthermore, as in Comparative Example 4, the sheet resistance was measured (Table 1).

Example 6

A silver nanowire transparent electrode that was surface treated with the dye B was prepared in a similar way to Example 5, except that instead of using the dye A synthesized in Synthesis Example 1 as in Example 5, the dye B synthesized in Synthesis Example 2 was used. The sheet resistance was then measured (Table 1).

Example 7

A silver nanowire transparent electrode that was surface treated with the dye C was prepared in a similar way to Example 5, except that instead of using the dye A synthesized in Synthesis Example 1 as in Example 5, the dye C synthesized in Synthesis Example 3 was used. The sheet resistance was then measured (Table 1).

Example 8

A silver nanowire transparent electrode that was surface treated with the dye D was prepared in a similar way to Example 5, except that instead of using the dye A synthesized in Synthesis Example 1 as in Example 5, the dye D synthesized in Synthesis Example 4 was used. The sheet resistance was then measured (Table 1).

Comparative Example 5

A silver nanowire transparent electrode that was surface treated with the dye E was prepared in a similar way to Example 5, except that instead of using the dye A synthesized in Synthesis Example 1 as in Example 5, the dye E synthesized in Synthesis Example 5 was used. The sheet resistance was then measured (Table 1).

Comparative Example 6

A silver nanowire transparent electrode that was surface treated with the dye F was prepared in a similar way to Example 5, except that instead of using the dye A synthesized in Synthesis Example 1 as in Example 5, the dye F synthesized in Synthesis Example 6 was used. The sheet resistance was then measured (Table 1).

Example 9

<Preparation of Silver Nanowire Ink (Dispersion Liquid)>
Silver nanowire ink with the following composition was prepared.
(1) Metal nanowires: silver nanowires (AgNW-25, manufactured by Seashell Technology, LLC, average diameter of 25 nm, average length of 23 μm) in an amount of 0.05 parts by mass
(2) Dye: Dye A synthesized in Synthesis Example 1, in an amount of 0.015 parts by mass
(3) Binder: hydroxypropylmethyl cellulose (manufactured by Aldrich Corporation, a 2% aqueous solution thereof having a viscosity of 80 cP to 120 cP at 20° C. (literature data)) in an amount of 0.1 parts by mass
(4) Cross-linking agent: organic titanium compound (Orgatix TC-400, manufactured by Matsumoto Fine Chemical Co. Ltd.) in an amount of 0.01 parts by mass (5) Solvent: (i) water in an amount of 88.835 parts by mass, (ii) 1-propanol in an amount of 10 parts by mass, (iii) isopropanol in an amount of 0.99 parts by mass <Preparation of Silver Nanowire Transparent Electrode>

The silver nanowire transparent electrode was formed by the following procedure.

First, the prepared silver nanowire ink (dispersion liquid) was coated onto the transparent substrate (U34, PET: manufactured by Toray Industries, Inc., thickness of 125 μm) using a coil bar (count 10) to form a silver nanowire dispersion film. At this time, the coating amount of the silver nanowires was approximately 0.011 g/m².

Subsequently, in atmospheric air, hot air was blown from a dryer onto the coated surface to dry and remove the solvent included in the silver nanowire dispersion film.

The result was then subjected to heat curing treatment for 5 minutes in an oven at 120° C.

Next, by using a calendering processor including a cylindrical press roll and a back roll (see FIG. 14), calendering processing (nip width of 1 mm, load of 4 kN, and speed of 1 m/min) was performed.

The sheet resistance was measured by placing the measurement probe of a manual type non-damaging resistance measurement instrument (EC-80P, manufactured by Napson Corporation) into contact with the surface of the silver nanowire dispersion film, measuring the resistance at any three locations on the transparent conductive film (silver nanowire layer), and taking the average as the sheet resistance. The sheet resistance was 90 Ω/sq.

Example 10

A silver nanowire transparent electrode that was surface treated with the dye B was prepared in a similar way to Example 9, except that instead of using the dye A synthesized in Synthesis Example 1 as in Example 9, the dye B synthesized in Synthesis Example 2 was used. The sheet resistance was then measured (Table 1).

Example 11

A silver nanowire transparent electrode that was surface treated with the dye C was prepared in a similar way to Example 9, except that instead of using the dye A synthesized in Synthesis Example 1 as in Example 9, the dye C synthesized in Synthesis Example 3 was used. The sheet resistance was then measured (Table 1).

Example 12

A silver nanowire transparent electrode that was surface treated with the dye D was prepared in a similar way to Example 9, except that instead of using the dye A synthesized in Synthesis Example 1 as in Example 9, the dye D synthesized in Synthesis Example 4 was used. The sheet resistance was then measured (Table 1).

(Evaluation)

Evaluations of the following were performed on the transparent electrodes produced in Examples 1 to 12 and Comparative Examples 1 to 6: A) reflection L value, B) black floating, and C) electrode pattern invisibility. The evaluations were performed as follows.

<A> Evaluation of Reflection L Value>

With the transparent electrodes that were obtained, black vinyl tape (VT-50, manufactured by NICHIBAN Co., Ltd.) was adhered to the transparent conductive film (silver nanowire layer) side, and the reflection L value was evaluated from the side opposite to the transparent conductive film (silver nanowire layer) using Color i5 manufactured by X-Rite, Inc. in accordance with JIS Z8722. The measurement was conducted at three randomly chosen positions, and the average was taken as the reflection L value.

<B> Evaluation of Black Floating>

On the transparent electrodes obtained in Examples 1 to 8 and Comparative Examples 2, 3, 5, and 6, a portion not surface treated (untreated portion) was formed adjacent to the portion that was surface treated (treated portion). With black vinyl tape (VT-50, manufactured by NICHIBAN Co., Ltd.) adhered to the transparent conductive film (silver nanowire layer) that had the treated portion and the untreated portion formed thereon, a fluorescent light was shone on the side opposite to the transparent conductive film (silver nanowire layer), and the occurrence of black floating was visually observed. The occurrence of black floating was then evaluated with the following evaluation criteria.

—Evaluation Criteria—

Good: the border between the treated portion and the untreated portion could be discerned immediately, and black floating was reduced in the treated portion Acceptable: the border between the treated portion and the untreated portion could be discerned depending on the angle, and black floating was reduced in the treated portion Poor: the border between the treated portion and the untreated portion was indiscernible, and black floating occurred in the treated portion Note that Comparative Example 1 was the same as the untreated portion in Examples 1 to 4 and Comparative Examples 2 and 3, and Comparative Example 4 was the same as the untreated portion in Examples 5 to 8 and Comparative Examples 5 and 6. In other words, the three-tier evaluation of Examples 1 to 4 and Comparative Examples 2 and 3 is an evaluation based on Comparative Example 1, and the three-tier evaluation of Examples 5 to 8 and Comparative Examples 5 and 6 is an evaluation based on Comparative Example 4.

For the transparent electrodes obtained in Examples 9 to 12, black vinyl tape (VT-50, manufactured by NICHIBAN Co., Ltd.) was adhered to the transparent conductive film (silver nanowire layer) side, a fluorescent light was shone on the side opposite to the transparent conductive film (silver nanowire layer), and the occurrence of black floating was visually observed. The occurrence of black floating was then evaluated with the following evaluation criteria.

—Evaluation Criteria—

Good: the difference from Comparative Example 4 could be discerned immediately, and black floating was reduced Acceptable: the difference from Comparative Example 4 could be discerned depending on the angle, and black floating was reduced Poor: the difference from Comparative Example 4 was indiscernible, and black floating occurred <C> Evaluation of Electrode Pattern Invisibility>

Figure 15:
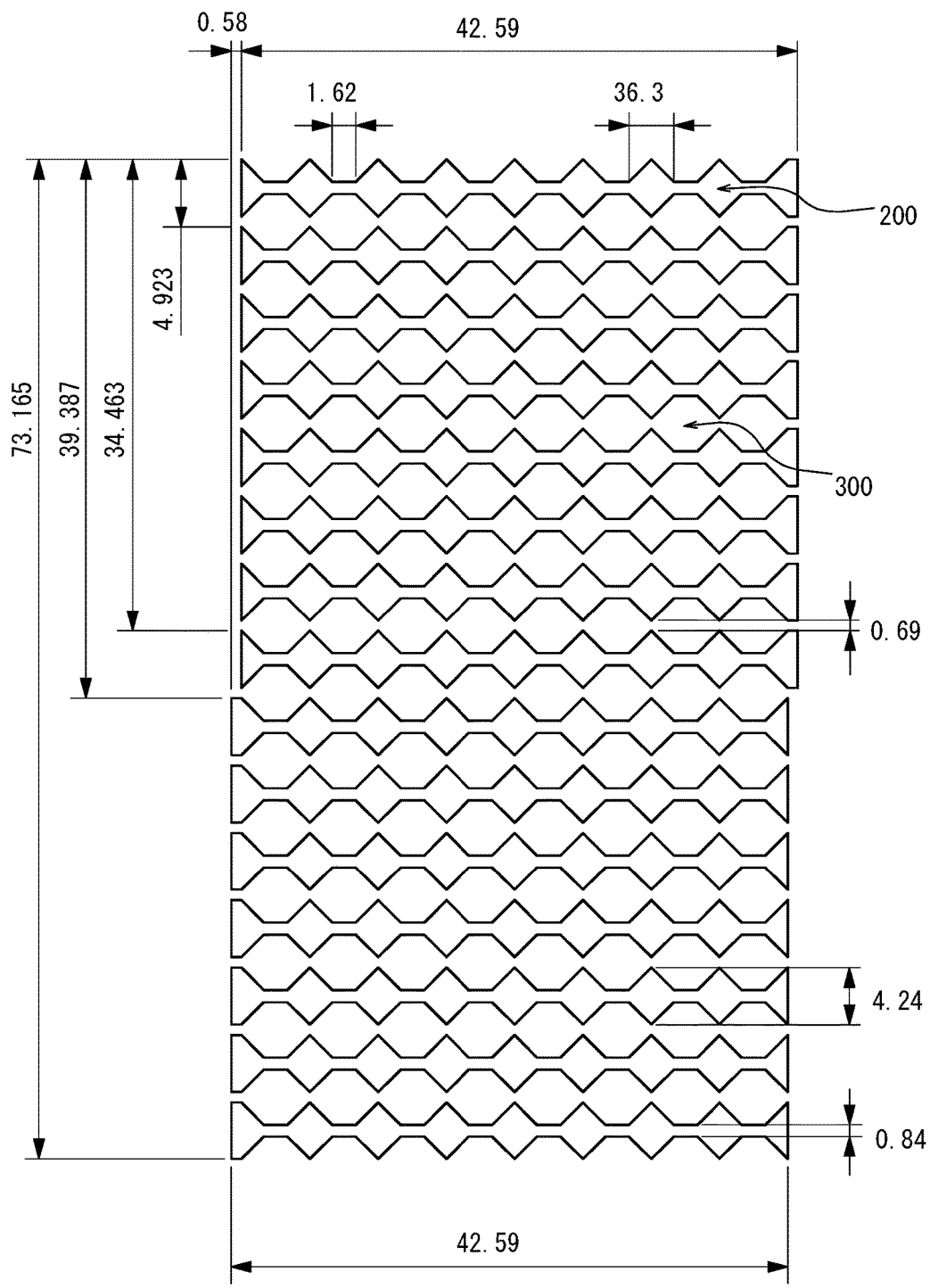
FIG. 15 is a schematic view of an electrode pattern used to evaluate electrode pattern invisibility in the Examples of this application.

A resist layer was formed on the transparent conductive film (silver nanowire layer) of the transparent electrodes that were obtained, and the resist layer was then exposed using a Cr photomask on which an electrode pattern was formed. At this time, a diamond pattern was used as the electrode pattern of the Cr photomask. Next, the resist layer was developed to form a resist pattern, and with this resist pattern as a mask, the transparent conductive film (silver nanowire layer) was subjected to wet etching using a mixed acid etchant for Al. The resist layer was then removed using alkaline developing fluid. In this way, an electrode pattern such as the one in FIG. 15 was formed (in FIG. 15, the units of numbers other than reference numbers are mm).

Black vinyl tape (VT-50, manufactured by NICHIBAN Co., Ltd.) was adhered to the electrode pattern side, and a glass plate (MICRO SLIDE GLASS S9213, manufactured by Matsunami Glass Inc., Ltd.) was adhered to the opposite side from the electrode pattern, with a transparent double-sided adhesive sheet (product name LUCIACS CS9621T, manufactured by Nitto Denko Corporation) therebetween.

A fluorescent light was shone on the glass surface, and the electrode pattern was visually observed to evaluate the electrode pattern invisibility with the following evaluation criteria.

—Evaluation Criteria—
Good: pattern was difficult to confirm
Acceptable: pattern was extremely difficult to confirm, but could be confirmed depending on the angle
Poor: pattern could be confirmed easily In Examples 1 to 4 and Comparative Examples 2 and 3, similar results were obtained even when forming the electrode pattern with the following steps.

After coating silver nanowire ink (dispersion liquid) on a PET substrate and drying the ink, a Cr photomask was softly contacted on the substrate, which was then irradiated with ultraviolet rays at a cumulative amount of light of 200 mJ/cm$^2$ using an alignment and exposure apparatus manufactured by Toshiba Lighting & Technology, thereby curing the exposed portion. Next, 100 mL of 20% by mass acetate solution was sprayed in shower form to remove the non-exposed portion for development. Subsequently, calendering processing (nip width of 1 mm, load of 4 kN, and speed of 1 m/min) was performed, after which surface treatment was performed by soaking (80° C., 30 minutes) in an ethanol solution (0.2% by mass) of dye. A transparent pattern electrode was thus produced. Similar results were obtained when performing the calendering processing after the surface treatment or before the ultraviolet curing.

Table 1 lists the evaluation results.

Comparing the evaluation results for Comparative Example 1 and Examples 1 to 4 in Table 1, it is clear that improvement in black floating and electrode pattern invisibility can be achieved by surface treating the silver nanowires in the transparent electrode with the thiol group-containing colored compound (dye) of this disclosure.

Furthermore, in the evaluation results for Comparative Examples 2 and 5 in Table 1, the sheet resistance ended up increasing, without a reduction in the reflection L value. Based on these results, it is thought that the dye E did not adsorb on the surface of the silver nanowires, but rather partially eluted the silver nanowires. Hence, it is clear that the spacer "4-pyridine ethylene group" in the dye E is inappropriate as a spacer that reduces the acidity of the thiol group.

Furthermore, in the evaluation results for Comparative Examples 3 and 6 in Table 1, the sheet resistance ended up increasing, with no reduction or only a slight reduction in the reflection L value. Based on these results, it is thought that the dye F did not adsorb on the surface of the silver nanowires, but rather partially eluted the silver nanowires. Hence, it is clear that the dye F without a spacer is inappropriate as a colored compound (dye).

Comparing the evaluation results for Comparative Example 4 and Examples 5 to 8 in Table 1, it is clear that improvement in black floating and electrode pattern invisibility can be achieved by surface treating the silver nanowires in the transparent electrode with the thiol group-containing colored compound (dye) of this disclosure.

Comparing the evaluation results for Comparative Example 4 and Examples 9 to 12 in Table 1, it is clear that improvement in black floating and electrode pattern invisibility can be achieved by using silver nanowire ink that includes silver nanowires that have been surface treated with the thiol group-containing colored compound (dye) of this disclosure.

TABLE 1

|  | Method of curing binder | Dye | Method of surface treating with dye | Sheet resistance (Ω/sq) | Reflection L value | Black floating | Electrode pattern invisibility |
|---|---|---|---|---|---|---|---|
| Comparative Example 1 | UV | — | — | 100 | 9.3 | — | poor |
| Example 1 | UV | dye A | soaking | 120 | 8.2 | good | good |
| Example 2 | UV | dye B | soaking | 120 | 8.2 | good | good |
| Example 3 | UV | dye C | soaking | 110 | 8.2 | good | good |
| Example 4 | UV | dye D | soaking | 110 | 8.2 | good | good |
| Comparative Example 2 | UV | dye E | soaking | 300 | 9.3 | poor | poor |
| Comparative Example 3 | UV | dye F | soaking | 250 | 9.1 | poor | poor |
| Comparative Example 4 | heat | — | — | 100 | 9.1 | — | poor |
| Example 5 | heat | dye A | soaking | 120 | 8.2 | good | good |
| Example 6 | heat | dye B | soaking | 120 | 8.2 | good | good |
| Example 7 | heat | dye C | soaking | 110 | 8.2 | good | good |
| Example 8 | heat | dye D | soaking | 110 | 8.2 | good | good |
| Comparative Example 5 | heat | dye E | soaking | 300 | 9.1 | poor | poor |
| Comparative Example 6 | heat | dye F | soaking | 250 | 9.1 | poor | poor |
| Example 9 | heat | dye A | ink with dye | 90 | 8.6 | good | good |
| Example 10 | heat | dye B | ink with dye | 80 | 8.6 | good | good |
| Example 11 | heat | dye C | ink with dye | 80 | 8.5 | good | good |
| Example 12 | heat | dye D | ink with dye | 80 | 8.5 | good | good |

Industrial Applicability

The thiol group-containing colored compound of this disclosure, metal nanowires surface treated with the thiol group-containing colored compound, a dispersion liquid including the metal nanowires, and a transparent conductive film including the metal nanowires may in particular be used suitably in a touch panel and may also be used suitably in applications other than a touch panel (such as an organic EL electrode, a surface electrode of a photovoltaic cell, a transparent antenna (such as a wireless charger antenna for a mobile phone or smartphone), and a transparent heater which may be used to prevent dew condensation).

Reference Signs List

1 Metal nanowire
2 Metal nanowire body
2a Surface of metal nanowire
3 Thiol group-containing colored compound (dye)
31 Binder layer
40 Substrate
50 Overcoat layer
60 Anchor layer
70 Cured product
80 Colored compound (dye) dispersion liquid
100 Press roll
110 Back roll
120 Transparent conductive film
130 PET substrate
200 Electrode
300 Insulating portion

The invention claimed is:

1. A metal nanowire comprising a metal nanowire body, wherein at least a portion of a surface of the metal nanowire body is surface treated with a thiol group-containing colored compound,
wherein the thiol group-containing colored compound comprises a chromophore having absorption in a visible light region, a thiol group, and a spacer provided between the chromophore and the thiol group,
wherein the spacer is a chain alkylene group having 2 to 30 carbon atoms, a cyclic alkylene group having 3 to 30 carbon atoms, a 2-amino ethylene group, a 6-amino hexylene group, a 11-amino undecylene group, a 16-amino hexadecylene group, an amino propylene group, an amino butylene group, an amino pentylene group, or an amino octylene group, and
wherein the chromophore includes at least one selected from the group consisting of a Cr complex, a Cu complex, a Co complex, a Ni complex, an Fe complex, an azo group, and an indoline group.

2. The metal nanowire of claim 1, wherein the metal nanowire body comprises at least one element selected from the group consisting of Ag, Au, Ni, Cu, Pd, Pt, Rh, Ir, Ru, Os, Fe, Co, Sn, Al, Tl, Zn, Nb, Ti, In, W, Mo, Cr, Fe, V, and Ta.

3. A dispersion liquid comprising:
the metal nanowires of claim 1;
a solvent; and
a binder.

4. A transparent conductive film comprising the metal nanowires of claim 1.

5. The transparent conductive film of claim 4, wherein the metal nanowires are dispersed in a transparent binder.

6. The transparent conductive film of claim 4, wherein a reflection L value of the transparent conductive film is 9 or less.

7. The transparent conductive film of claim 4, further comprising a metal nanowire body that is not surface treated with the thiol group-containing colored compound.

8. An information input device comprising:
a transparent substrate; and
the transparent conductive film of claim 4 disposed on the transparent substrate.

9. An electronic apparatus comprising:
a display panel; and
the transparent conductive film of claim 4 disposed on the display panel.

10. The metal nanowire of claim 1, wherein the thiol group-containing colored compound is represented by general formula (1):

R—W—SH (1)

where R is a chromophore having absorption in a visible light region, and W is a chain alkylene group having 2 to 30 carbon atoms, a cyclic alkylene group having 3 to 30carbon atoms, a 2-amino ethylene group, a 6-amino hexylene group, a 11-amino undecylene group, a 16-amino hexadecylene group, an amino propylene group, an amino butylene group, an amino pentylene group, or an amino octylene group.

* * * * *